United States Patent [19]

Wright et al.

[11] Patent Number: 5,730,072
[45] Date of Patent: Mar. 24, 1998

[54] METHOD AND SYSTEM FOR CONTINUOUS RAPID INCINERATION OF SOLID WASTE IN AN OXYGEN-RICH ENVIRONMENT

[75] Inventors: Frank H. Wright, Rowlett; Martin A. Sokolowski, Plano; Matthew H. Fleeger, Dallas, all of Tex.

[73] Assignee: Advanced Envirotech Systems, Inc., Dallas, Tex.

[21] Appl. No.: 544,069

[22] Filed: Oct. 17, 1995

[51] Int. Cl.[6] .................................................. F23J 11/00
[52] U.S. Cl. ........................... 110/345; 110/346; 110/244; 110/259; 110/213; 110/235
[58] Field of Search ................................. 110/213, 235, 110/244, 255, 258, 259, 346, 104 R, 108, 110, 165 R, 171

[56] References Cited

U.S. PATENT DOCUMENTS

| | | | |
|---|---|---|---|
| 1,155,684 | 10/1915 | Rexroat | 110/104 R |
| 4,438,705 | 3/1984 | Basic, Sr. | 110/235 |
| 4,667,606 | 5/1987 | Svärd | 110/110 |
| 4,718,357 | 1/1988 | Wang et al. | 110/210 X |
| 4,787,321 | 11/1988 | Schnellbacher et al. | 110/258 |
| 5,203,267 | 4/1993 | Greene et al. | 110/212 |
| 5,277,136 | 1/1994 | Davis | 110/110 X |

FOREIGN PATENT DOCUMENTS

| | | | |
|---|---|---|---|
| 745571 | 5/1933 | France | 110/108 |
| 84921 | 5/1982 | Japan | 110/110 |

*Primary Examiner*—Henry Bennett
*Assistant Examiner*—Susanne C. Tinker
*Attorney, Agent, or Firm*—Fulbright & Jaworski L.L.P.

[57] ABSTRACT

A method and system for continuous incineration of solid waste, directed to reducing formation of pathogens (such as dioxins) during incineration by inducing rapid combustion in an oxygen-rich environment. Waste may be shredded first. Waste is then dispersed widely across a first combustion chamber in which it undergoes incineration into ash and gas. Alternative embodiments for continuous removal of hot ash are disclosed. Gas is encouraged to travel a spiral path into a second combustion chamber, in which further incineration occurs. Gas travels through the second combustion chamber also in a spiral path, and is cooled in a quench tube. An evacuator means, advantageously a large fan, draws air through the system continuously during combustion, encouraging flow of waste through the system and replenishing oxygen available for rapid combustion.

36 Claims, 22 Drawing Sheets

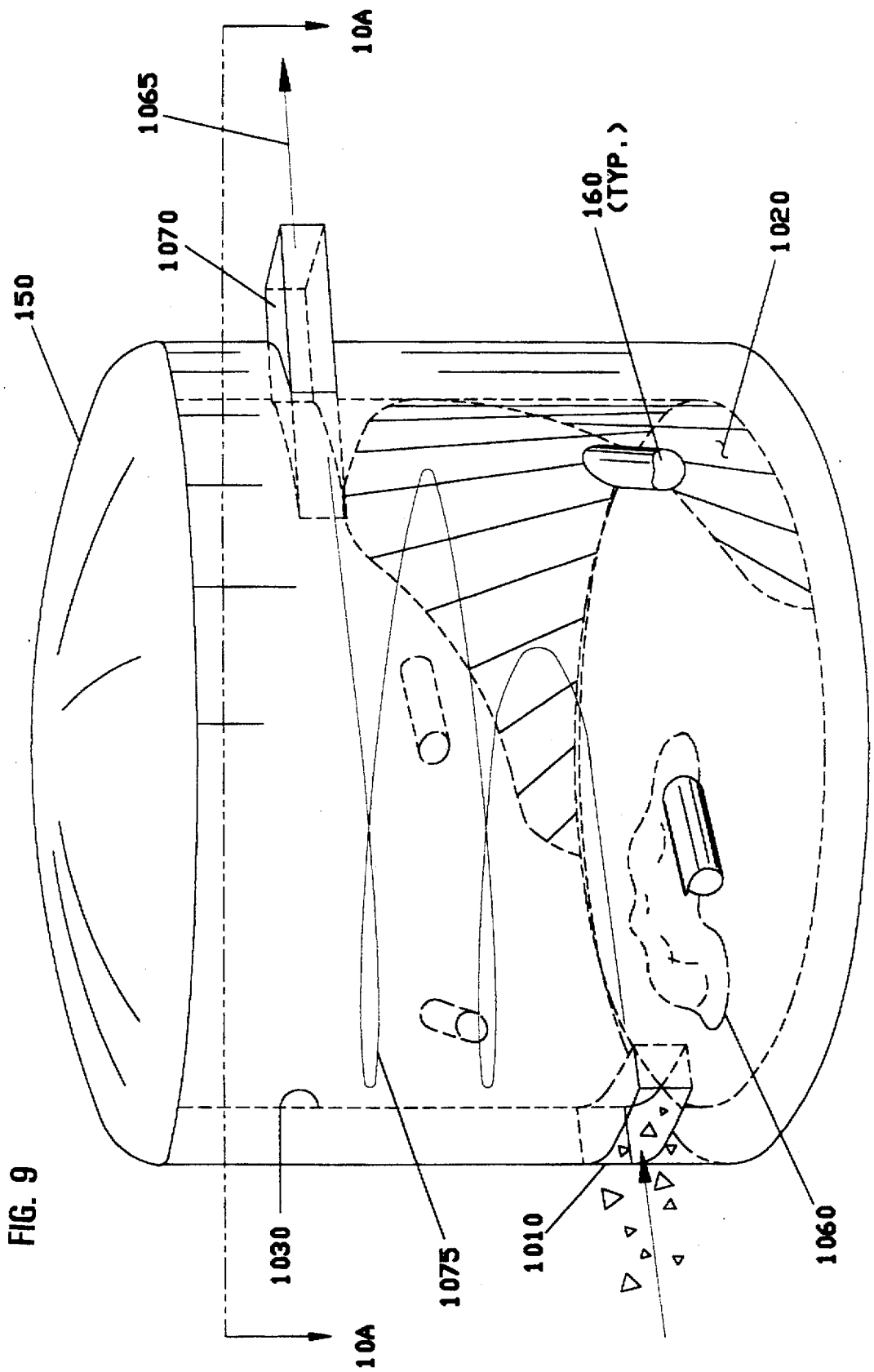

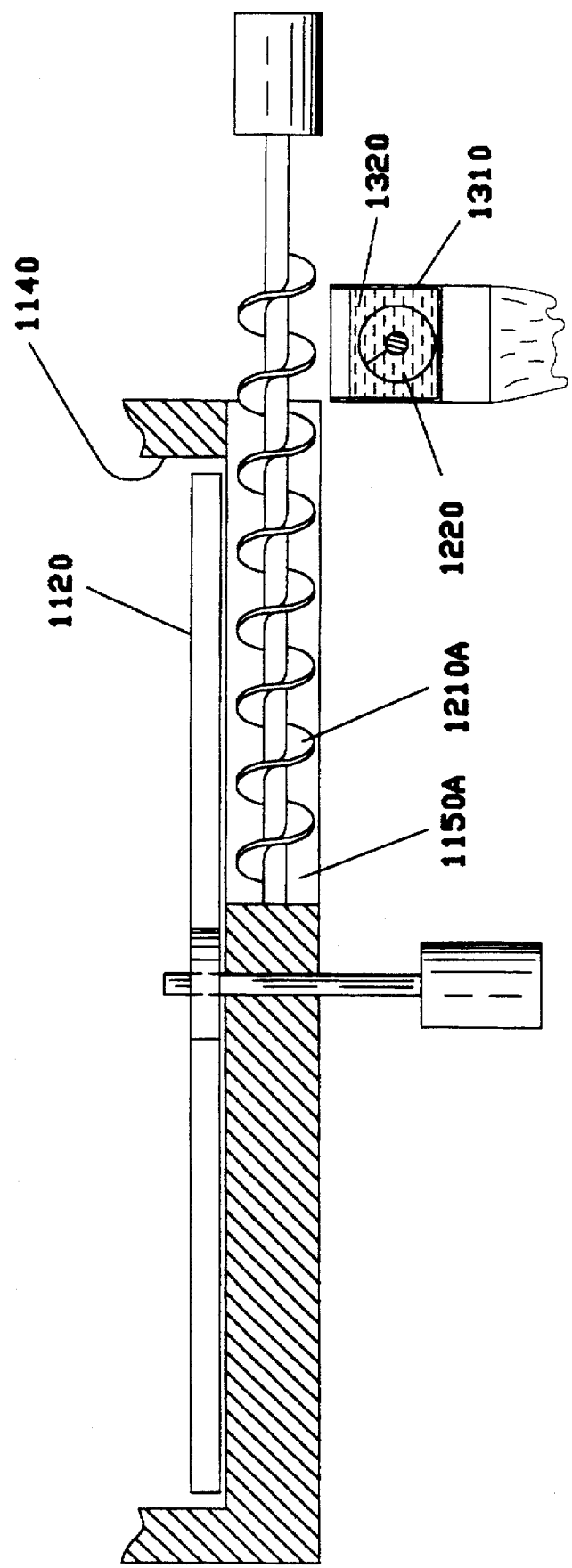

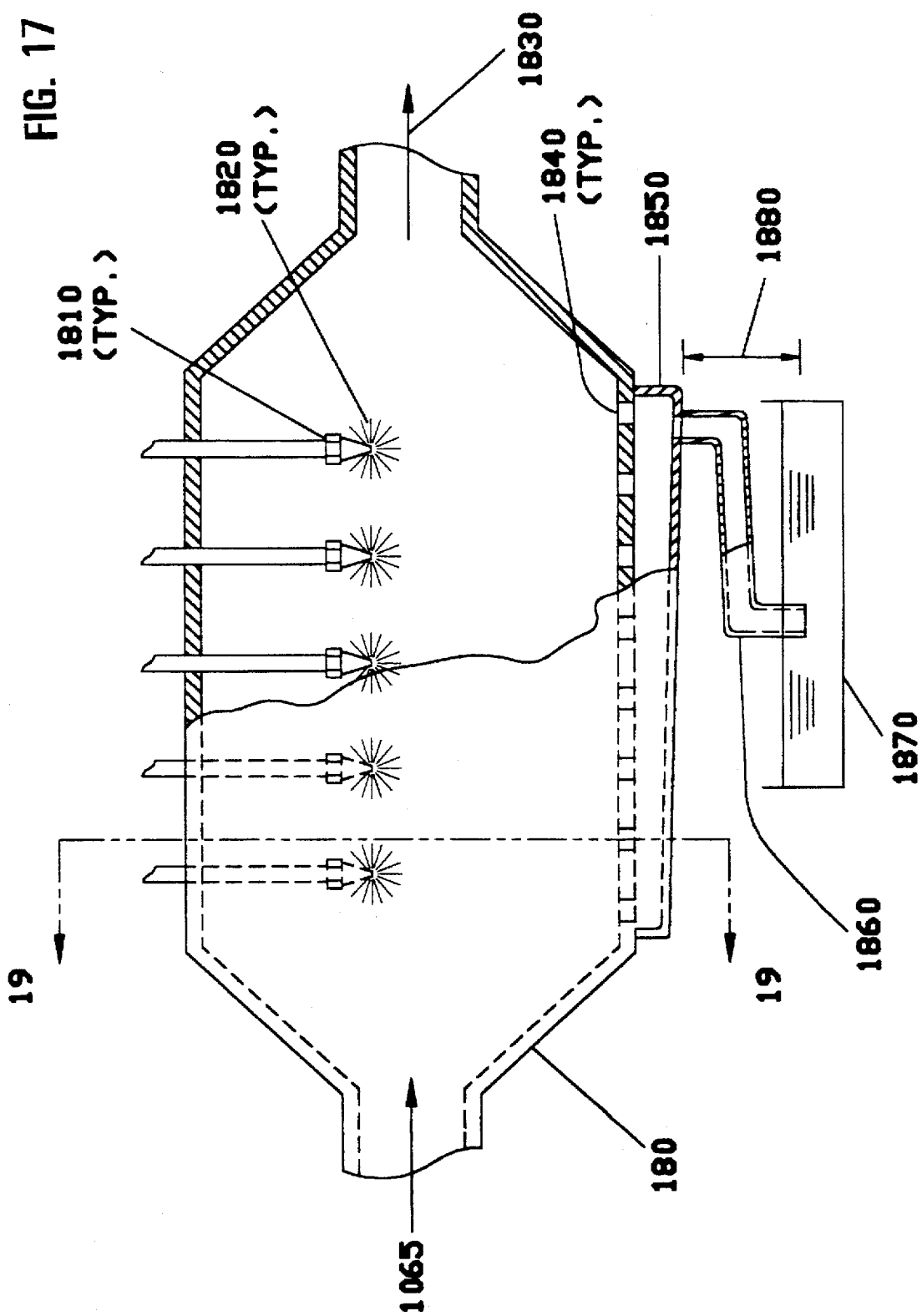

METHOD AND SYSTEM FOR CONTINUOUS RAPID INCINERATION OF SOLID WASTE IN AN OXYGEN-RICH ENVIRONMENT

TECHNICAL FIELD OF THE INVENTION

This invention is generally directed to a method and system for continuous incineration of solid waste, and specifically to accomplishing such incineration rapidly in an oxygen-rich environment.

BACKGROUND OF THE INVENTION

Reference is hereby made to a related application, commonly assigned U.S. patent application Ser. No. 08/192,106, filed Feb. 4, 1994, in the name of Wright, et al., the disclosure of which application is incorporated herein by reference.

Reference is further made to Disclosure Document No. 347,626, filed Jan. 27, 1994, the disclosure of which is also incorporated herein by reference.

Incineration is well established as a means to dispose of solid waste effectively. When incinerated properly, many potentially noxious solid waste products can be reduced to harmless ash and gas residues.

Traditional solid waste incinerators have been typically designed in the past to operate in a "batch" mode whereby waste is divided into consignments that must be incinerated individually. A continuous system would clearly improve the efficiency and volumetric waste throughput of a typical batch feed system, as well as raising potential operational safety by reducing the need for repeated batch-by-batch human interaction with the waste.

Traditional solid waste incinerating systems have also displayed a tendency to create potentially carcinogenic by-products such as dioxins. In such systems, a moving hearth typically conveys waste slowly across the surface of a first combustion chamber in an oxygen-starved environment. This combustion environment causes the waste to decompose into ash and partially-combusted smoke. The smoke is then brought into a second combustion chamber and is ignited in the presence of sufficient oxygen to, hopefully, complete the combustion process. The overall tendency of such a process is towards slow and incomplete combustion, leaving the potential for harmful by-products such as dioxins to form in the ash and the exhaust. Dioxins are thought to be very carcinogenic and are generally known to form as by-products of slowly incinerated waste at combustion temperatures between 300° F. to 60020 F.

There is therefore a need for continuous solid waste disposal systems that feature rapid incineration so as to minimize the formulation of harmful by-products such as dioxins. Any such rapid incineration must, however, be balanced with existing regulatory requirements to maintain "residence time", a prescribed minimum time period in which gaseous products of combustion of the waste must be maintained at elevated temperatures and in the presence of sufficient oxygen to assure complete combustion.

SUMMARY OF THE INVENTION

The present invention synergizes several innovations to provide a continuous waste processor whose combustion characteristics feature rapid incineration while still maintaining regulatory residence time.

The system generally discloses a hopper for receiving raw waste and directing it into a shredder. The shredder acts to cut the waste into small pieces of waste. The shredded waste is propelled into a first combustion chamber where it is rapidly incinerated into ash and gas. The waste ash is removed mechanically and cooled for further disposal. The gas passes into a second combustion chamber for further incineration. Upon leaving the second chamber, the gas is cooled and then passed through a wet scrubber into the atmosphere.

A strategic innovation of the present invention is the way in which air flow and air pressures within the system are synergized to provide multiple and serendipitous benefits. A large extractor fan evacuates the system by drawing air continuously through the system in the direction of the flow of waste. Simultaneously, smaller injection air blowers introduce "make-up" air into the system. This continuous air flow creates an oxygen-rich combustion environment, whose advantages towards effective rapid incineration will be described below. The continuous air flow also enables enhanced control over the system, as also described below. Additionally, the continuous air flow contributes to maintaining an effective continuous process by providing uninterrupted encouragement to waste and waste combustion products to proceed through the system.

Further innovations described in more detail below also contribute to enabling an efficient continuous waste processor that can operate with a minimum of human physical contact with the waste. For example, improvements in the raw waste receiving hopper are disclosed, directed to maintaining continuous flow to the shredder. Other improvements in the automatic removal and disposal of hot ash from the first combustion chamber are also disclosed.

Turning to the innovations toward encouraging rapid incineration in more detail, the movement of air through the system constantly replenishes the combustion environment with oxygen available for combustion. It is well known in the art that standard fuel/oxygen burners, such as used in this invention, consume a certain amount of oxygen in achieving optimum stoichiometry. It is also axiomatic that during the course of sustained combustion, as the temperature in the interior of the combustion chambers increases, the amount of combustion fuel required to maintain that temperature will decrease. As flow of combustion fuel to the burners is reduced in response to this decreased need, the continuous flow of air through the system allows an increased concentration of oxygen to be available for the combustion process in the incineration of waste. The serendipity of this is that the increased concentration of oxygen is supplied at the precise time when it is most needed to perpetuate waste combustion and maintain continuous rapid incineration.

The above-described effect of continuous airflow perpetuating uninterrupted rapid combustion also spawns innovations directed toward controlling combustion fuel usage. Fuel flow to the burner is controlled with analog and/or digital control devices well-known in the art. It is also well-known that fuel flow can be reduced with these controls to a low-fire position as the need for combustion fuel decreases. The present invention takes the added step, however, of extinguishing the burners and the pilot gas completely when the combustion of waste supplies enough heat to sustain sufficient combustion chamber temperature. Then, when the combustion temperature eventually begins to fall (caused, for example, by reduction in waste flow through the system), combustion fuel to the pilot, and then to the burners in turn, may be reactivated. Flame safety instrumentation, standard in the art, controls the possibility of unignited combustion fuel accumulating within the combustion chamber.

Another novel feature of the present invention directed towards continuous rapid combustion is the generation of a spiraled travel path for gaseous waste products through the first and second combustion chambers. These spirals are created by placing burners at predetermined tangential angles within the cylindrical combustion chambers, and by locating the inlet and outlet on each of the chambers strategically to encourage the spiralling. In particular, the outlet of the second combustion chamber discloses an internal duct located to prevent exit of gaseous waste unless it has first traveled a spiraled path.

The spiraled travel of the gaseous waste allows the present invention to meet regulatory standards for residence time while still incinerating waste rapidly. As noted above, applicable regulations require that the waste gases be kept at a specific temperature for a minimum time period to ensure complete combustion. In traditional waste incineration systems, this regulatory requirement has encouraged slow combustion of waste, increasing the probability that harmful by-products may be formed, as described above. The spiraled travel of gaseous waste products disclosed by the present invention, however, fulfills the regulatory requirement for residence time, while still encouraging rapid incineration. The spiraled pathway allows control over the flow of gaseous waste so that the waste is subject to incineration long enough to achieve complete combustion, but will complete the combustion phase before harmful by-products can form.

Turning now to the objective of providing a continuous waste processor, the present invention's innovations in this regard begin in the hopper into which raw waste is first introduced to be shredded. The hopper's lids are designed to adapt into a chute that directs raw waste into the hopper with a minimum of physical human contact. A feed arm is disclosed inside the hopper that operates to encourage waste into the shredder below. The feed arm rotates back and forth between park positions, and encourages large pieces of rigid waste into the shredder which otherwise might bridge above the shredder. The feed arm also mixes and homogenizes the waste prior to shredding. Stress concentrators along the feed arm increase the pressure at the points of contact between the feed arm and the waste. This additional contact pressure further directly encourages waste into the shredder. The increased contact pressure caused by the stress concentrators also tends to deform rigid waste so that it becomes more susceptible to being "grabbed" by the rotating shredder wheels (cutting blades) beneath. Further, the contact pressure tends to break up or crack rigid waste, thereby enabling large pieces of waste to be passed into the shredder more easily.

Effective passage of raw waste through the hopper into the shredder is also facilitated by a lip formed in the bottom of the hopper against which rigid waste pieces may be crushed when engaged by the stress concentrators on the feed arm.

Once shredded, continuous rapid incineration of waste is further facilitated by two alternative methods of introducing shredded solid waste into the first combustion chamber. Experience has shown that improved rapid combustion will be achieved when the shredded solid waste is dispersed evenly across the cross-section area of the first combustion chamber, rather than being dumped or otherwise allowed to gather at one isolated location inside the chamber.

In one embodiment, the present invention discloses a rotary broadcaster onto which shredded waste is dropped for physical propulsion into the combustion chamber. Acting analogously to a fan, the rotating vanes of the broadcaster strike the shredded waste and propel it into the combustion chamber in a dispersed fashion. The rotating motion of the vanes also physically moves air into the combustion chamber, thereby making yet more oxygen available to the combustion process. Features are attached to the vanes that deter jamming and clogging of the broadcaster's moving parts.

In an alternative embodiment, twin cantilevered counter-rotating augers cooperate to propel shredded solid waste into the first combustion chamber. In this embodiment, the augers are cantilevered so that bearing support for the augers may be located outside the hot environment within the first combustion chamber. The shafts of the augers are disclosed as hollow, thereby enabling continuous fresh air flow through the shafts and into the first combustion chamber. As well as facilitating the oxygen-rich environment discussed above, this flow of air through the hollow shafts has the added advantages of cooling the shafts and assisting propulsion of waste off the ends of the shafts in a dispersed fashion throughout the interior of the combustion chamber.

The twin augers in this embodiment also cooperate to be self-cleaning. Disclosed as counter-rotating, the flights of these augers enmesh. Thus, during operation, minimal solid waste is permitted to accumulate on the flights of the augers, since the flights of the one auger have the tendency to scrape such accumulation off the other.

In addition to this self-cleaning advantage, twin augers are disclosed to facilitate improved waste velocity as waste travels up the augers. It should be noted, however, that the overall length of these augers must of necessity be kept fairly short, since they are cantilevered. A short cantilever will tend to display reduced vertical displacement at the unsupported, or cantilevered end during operation, thus encouraging true rotation of the enmeshed augers.

Although not claimed herein, the present invention discloses a further innovation in the design of its inclined augers. Experience in the transportation of shredded solid waste by inclined auger has shown that an undesirable quantity of liquid and small-size solid waste accumulates near the bottom of the incline of the auger. This accumulation is not easily conveyed away by the rotation of the auger and may tend to impair the performance thereof. The present invention discloses a conical attachment located around the base of each inclined auger, designed to remediate this kind of buildup. The cone has the tendency to push the small-size solid waste back on to the auger flights for further transportation.

Continuous waste processing is further facilitated by the present invention's innovations in regard to removal of hot ash from the first combustion chamber. A rabble arrangement is disclosed to remove ash from the hearth of the chamber in a safe, automated fashion. The arm rotates about the center of the hearth slowly, advantageously less than 1 r.p.m. Vanes on the rabble arm are disposed so that by acting in cooperation with the direction in which the arm is turning, they tend to push ash always further towards the outer perimeter of the hearth. A high temperature auger in a sump recessed in the hearth floor is located at the perimeter and removes the ash as it is deposited into the sump by the rotating rabble arm.

This high temperature auger then deposits the hot ash onto a second auger, which conveys the ash away for further disposal. This second auger is disclosed in combination with either a water jacket or a water trough to effect cooling of the hot ash as it is carried away from the combustion chamber.

The present invention also discloses alternative embodiments for removing ash from the hearth. These alternative embodiments include a rabble arm without vanes that deposit ash onto a hearth floor auger that extends substantially to the center of the hearth, and various cooperating auger combinations disposed across the hearth floor without a rotating rabble arm.

Once the gaseous waste has completed the combustion process, it is cooled rapidly in a horizontal quench tube prior to being passed through a conventional wet scrubber into the atmosphere. The present invention discloses further innovations within the quench tube in order to maintain the desired negative pressure within the entire system.

The quench tube cools using a standard evaporative cooling technique that sprays fine water droplets in the form of a fog over the passing hot gas. The passing hot gas evaporates the water droplets, thereby dissipating heat energy.

In order to make full use of the quench tube's cooling capabilities, however, a sufficient volume of water is introduced to saturate the passing hot gas. This saturation necessarily creates a certain amount of excess water during operation that must be drained away.

The spray nozzles within the quench tube are known in the art but are specifically chosen to create a fog that will maximize the cooling capability of the quench tube. The spray nozzles advantageously produce water droplets of small size, thereby maximizing evaporation potential. The nozzles are also positioned within the quench tube to ensure complete dispersal of fog throughout the quench tube, thereby minimizing the formation of dry areas.

The quench tube discloses an inclined sump that allows this excess water to drain into a secondary tank. This secondary tank is disposed so that a predetermined minimum static water head is maintained above the inlet through which the water from the quench tube drains. In this way, the predetermined minimum static head counterbalances the negative air pressure within the quench tube, and prevents the drain water from being drawn back into the quench tube by the negative air pressure therein.

Control over sustained continuous performance of the combustion process may be enabled by monitoring key combustion characteristics and using the data from such monitoring to modulate the invention's operational controls. For example, combustion within the system may be modulated according to data including temperature or atmospheric conditions such as oxygen or carbon monoxide levels.

The present invention therefore discloses information feedback loops between the system's operational controls and various sensing devices that monitor characteristics of combustion in progress.

These and other features of the present invention will be apparent to those skilled in this art from the detailed description of at least one preferred embodiment of the invention set forth below.

BRIEF DESCRIPTION OF THE DRAWINGS

This invention will be further described with reference to the accompanying drawings, in which:

FIG. 9 is a perspective view illustrating details within first combustion chamber 150.

FIG. 12A is a sectional view as shown on FIG. 12.

FIG. 17 is a side, partial cutaway view of quench tube 180.

DETAILED DESCRIPTION OF THE INVENTION

Figure 1:
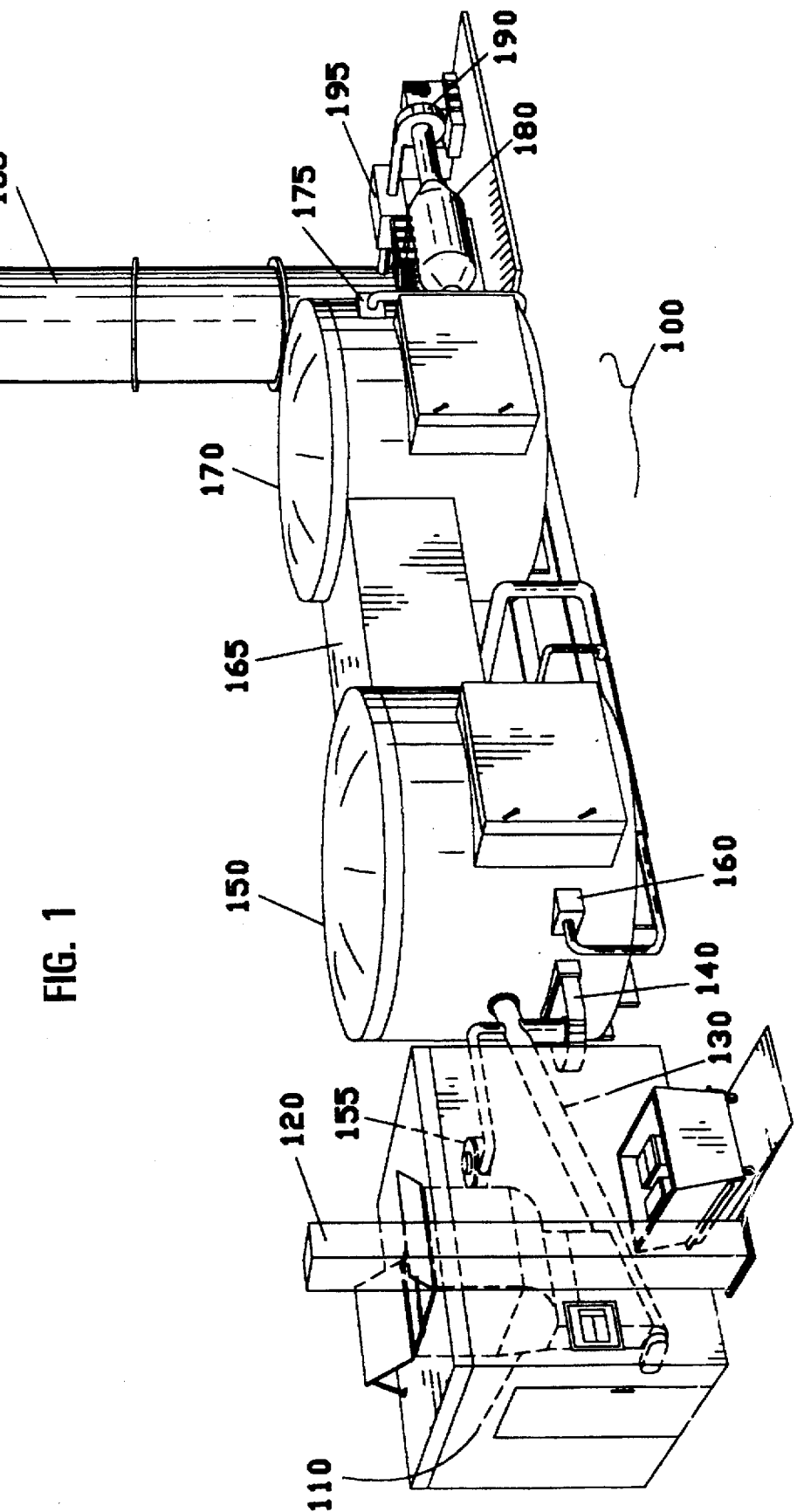
FIG. 1 is a general perspective view of the entire system.

As illustrated on FIG. 1, system 100 generally comprises hopper/shredder assembly 110 waiting to receive waste deposited therein from elevator 120. Following shredding, shredded waste conveyor auger 130 transports waste to broadcaster 140, which in turn disperses waste throughout first combustion chamber 150. Forced air supply 155, advantageously an injection air blower, forces air over broadcast waste and into first combustion chamber 150 with multiple advantages. First, forced air supply 155 cools broadcaster 140. Second, forced air supply 155 assists dispersal of waste by blowing waste wider into first combustion chamber 150. Third, forced air supply 155 replenishes oxygen in first combustion chamber 150, thereby promoting rapid combustion.

Combustion within first combustion chamber 150 is effected by at least one first stage burner 160, and advantageously four thereof. Combustion within first combustion chamber 150 incinerates waste into ash and gas. Gas passes through ducting 165 and into second combustion chamber 170. At least one second stage burner 175, and again advantageously four thereof, further incinerates gas in second combustion chamber 170. After second stage incineration, gas passes from second combustion 170 into quench tube 180. Gas is cooled within quench tube 180 before being passed into wet scrubber 185. Wet scrubber 185 is selected from shelf designs well known in the art. Following passage through wet scrubber 185, gas is released into the atmosphere.

Evacuating means 190, advantageously a large fan, draws air continuously through system 100 during operation. Located between quench tube 180 and wet scrubber 185, evacuating means 190 draws fresh air into system 100 primarily through hopper/shredder assembly 110, and in operation thereby tends to impart an artificial negative pressure within first combustion chamber 150, second combustion chamber 170, and quench tube 180. This negative pressure has the effect of promoting rapid flow of waste gases through system 100. The continuous flow of fresh air drawn through system 100 by evacuating means 190 also replenishes combustion chambers 150 and 170 continuously with fresh oxygen to maintain combustion therein.

Louvers 195 control evacuating means 190 by permitting attenuation of the volume of air drawn through system 100 by evacuating means 190.

Figure 2:
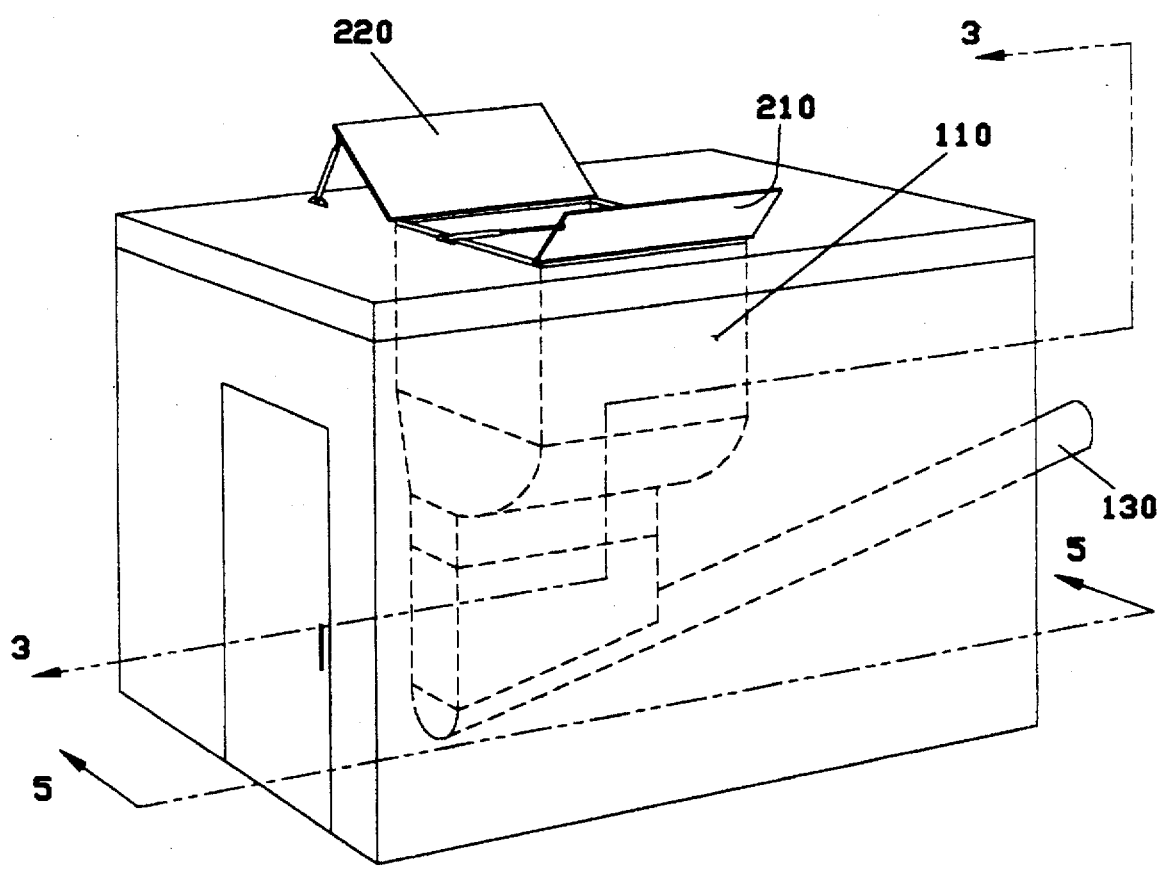
FIG. 2 is a perspective view of hopper/shredder assembly 110 with elevator 120 omitted for clarity.

FIG. 2 shows hopper/shredder assembly enlarged. First lid 210 and second lid 220 may be operated remotely, advantageously hydraulically, to open and close hopper/shredder assembly 110. Further, as shown on FIG. 3, first lid 210 and second lid 220 may also be operated remotely to cooperate and form a chute 305 to assist hands-free deposit of waste into hopper 310.

Figure 3:
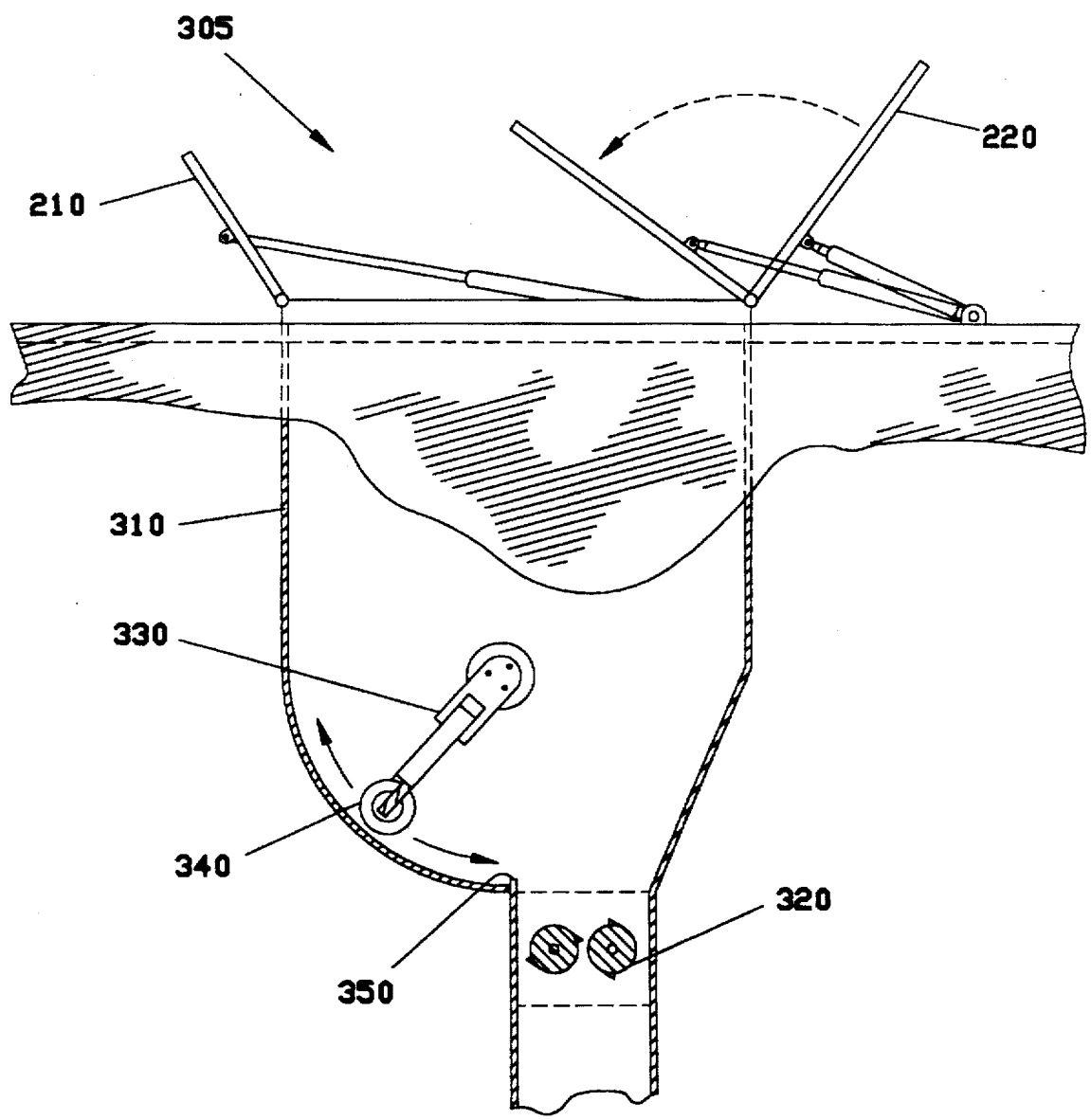
FIG. 3 is a sectional, cutaway view of hopper/shredder assembly 110 as shown on FIG. 2.

As also shown FIG. 3, hopper 310 funnels waste onto shredder 320. Feed arm 330 rotates within hopper 310 to encourage waste into shredder 320.

Figure 4:
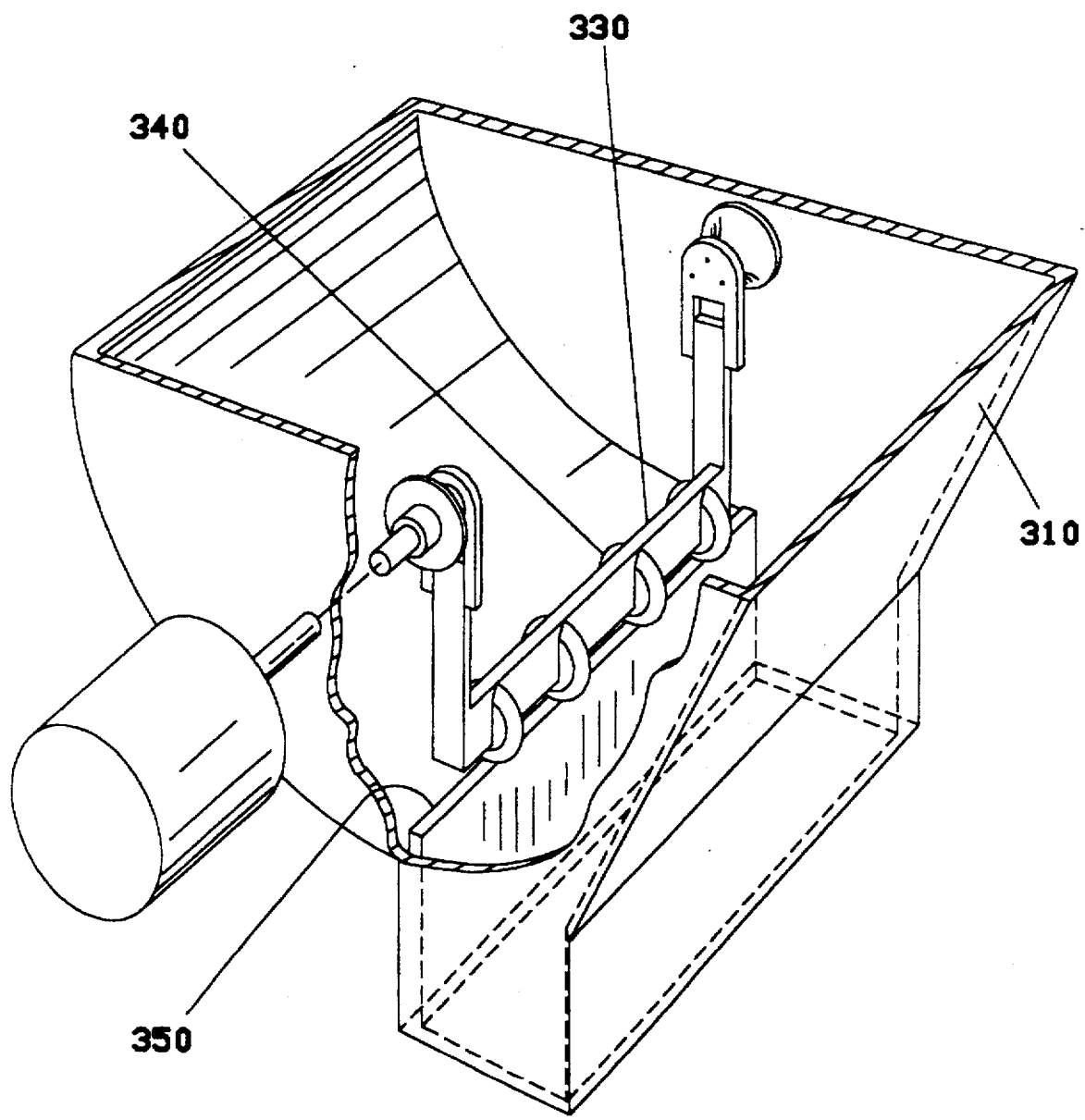
FIG. 4 further illustrates details of hopper 310 in perspective, cutaway view.

As shown FIG. 3, and in perspective cutaway view on FIG. 4, stress concentrators 340 are disposed along feed arm 330. Stress concentrators 340, acting in combination with lip 350 tend to disintegrate larger pieces of waste, thereby preparing them for passage into shredder 320.

Figure 6:
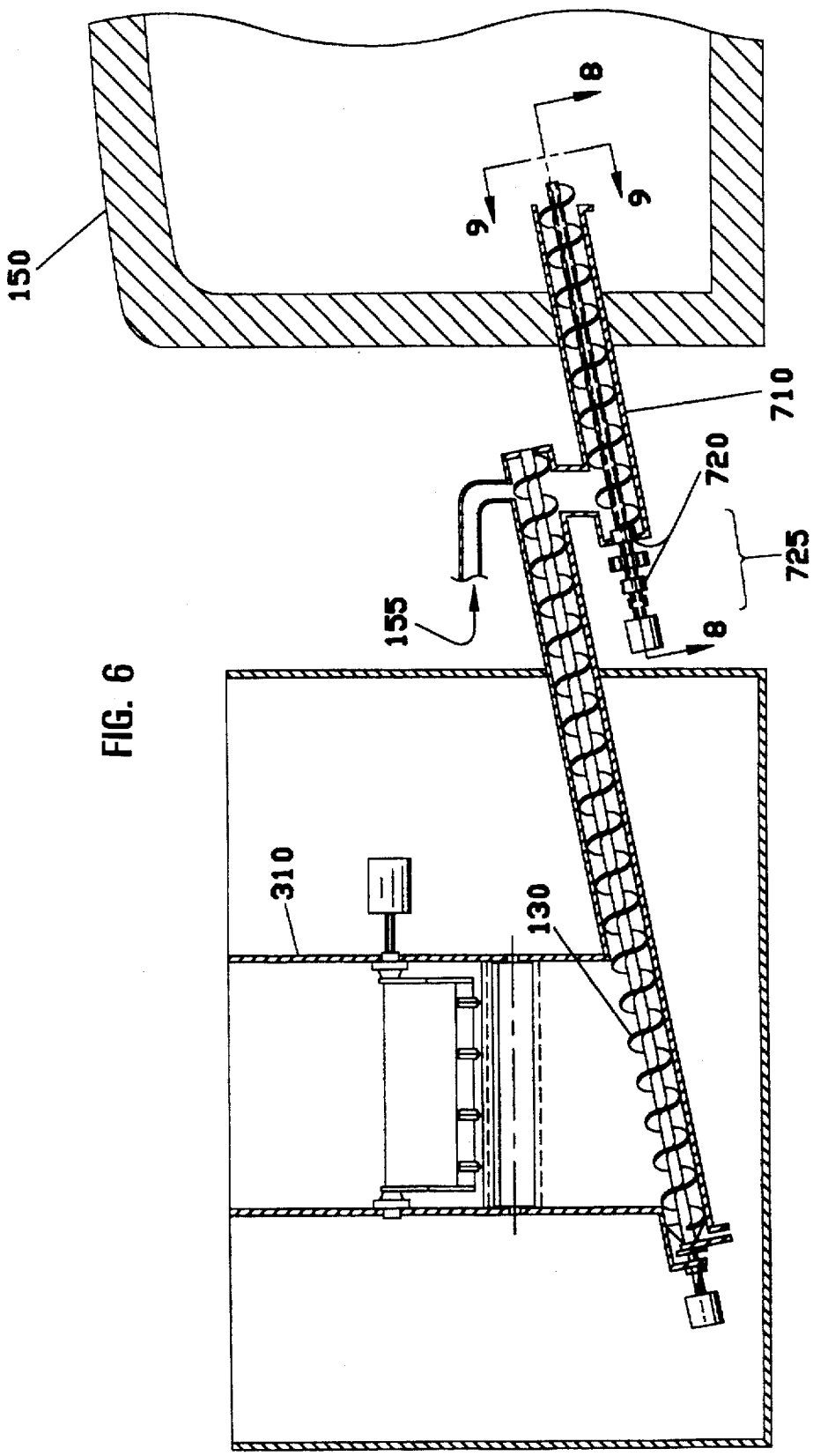
FIG. 6 is a cutaway view illustrating an alternative method of dispersing waste within first combustion chamber 150 using cantilevered auger assembly 710.

Turning now to FIG. 6, it will be seen that shredded waste is permitted to fall upon shredded waste conveyor auger 130 for transport to the incineration phase. Shredded waste conveyor auger 130 includes a conical member and drain at its lower end, which operate to prevent accumulation of small-sized shredded waste at the lower end by continuously encouraging said small-sized waste onto the flights of shredded waste conveyor auger 130.

Figure 5:
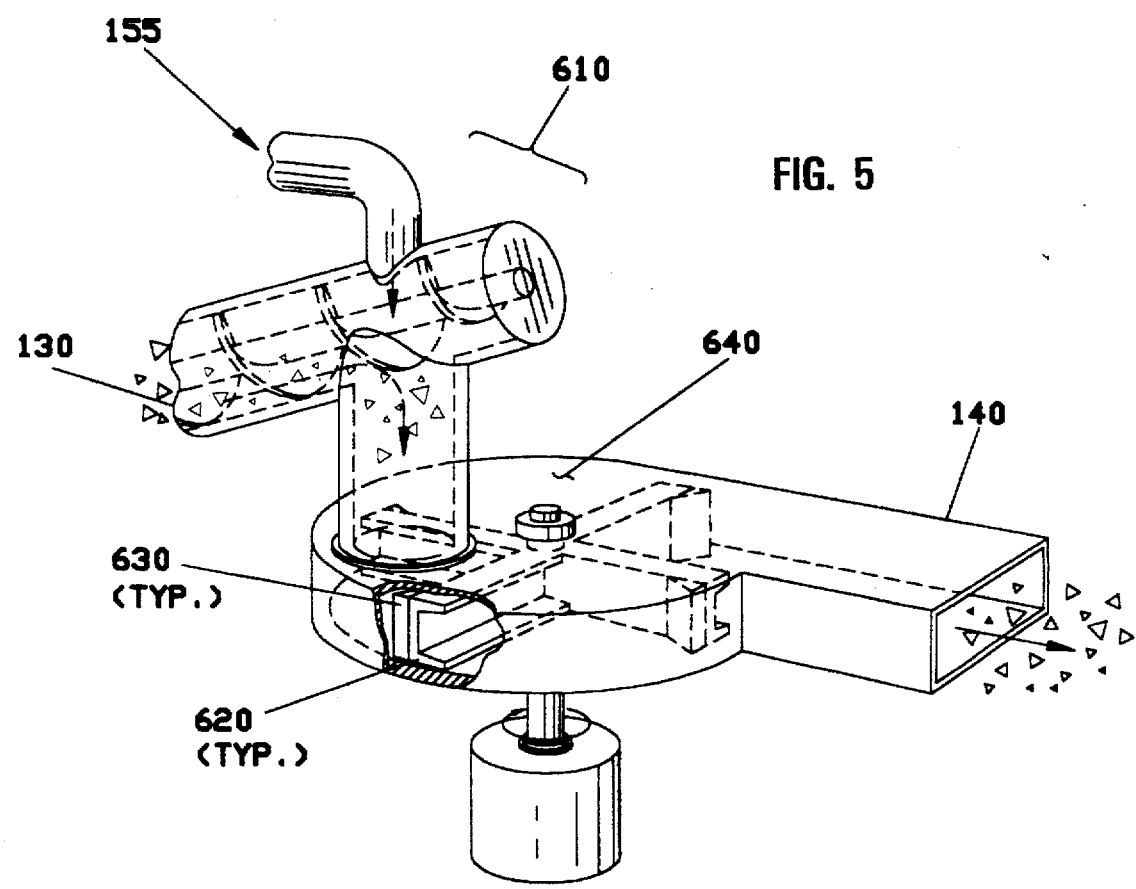
FIG. 5 is a perspective, partially cutaway view of broadcaster 140.

FIG. 5 illustrates one alternative embodiment of the present invention's means to disperse shredded waste into first combustion chamber 150. It will be seen that upper end 610 of shredded waste conveyor auger 130 deposits waste onto vanes 620 rotating within broadcaster 140. Forced air supply 155 may advantageously be used to assist the flow of waste through broadcaster 140. As shown on FIG. 1, broadcaster 140 is in shredded waste communication with first combustion chamber 150, enabling broadcaster 140 to disperse waste widely throughout first combustion chamber 150. Returning to FIG. 5, it will be seen that vanes 620 may advantageously be self-cleaning by means of scrapers 630. As vanes 620 rotate, scrapers 630 discourage the accumulation of waste between vanes 620 and broadcaster casing 640.

FIG. 6 discloses an alternative embodiment of the present invention's means for dispersing waste into first combustion chamber 150. FIG. 6 shows that instead of depositing waste onto broadcaster 140, as illustrated in FIG. 5, shredded waste conveyor auger 130 deposits waste onto cantilevered auger assembly 710. Again, forced air supply 155 assists the cooling of cantilevered auger assembly 710. Cantilevered auger assembly 710 is supported by bearings 720 at lower end 725 so as to effect a cantilever into first combustion chamber 150. In this way, the need to support cantilevered auger assembly 710 from within first combustion chamber 150 is obviated, thereby eliminating hot service bearings or linkage for cantilevered auger assembly 710.

Figure 7:
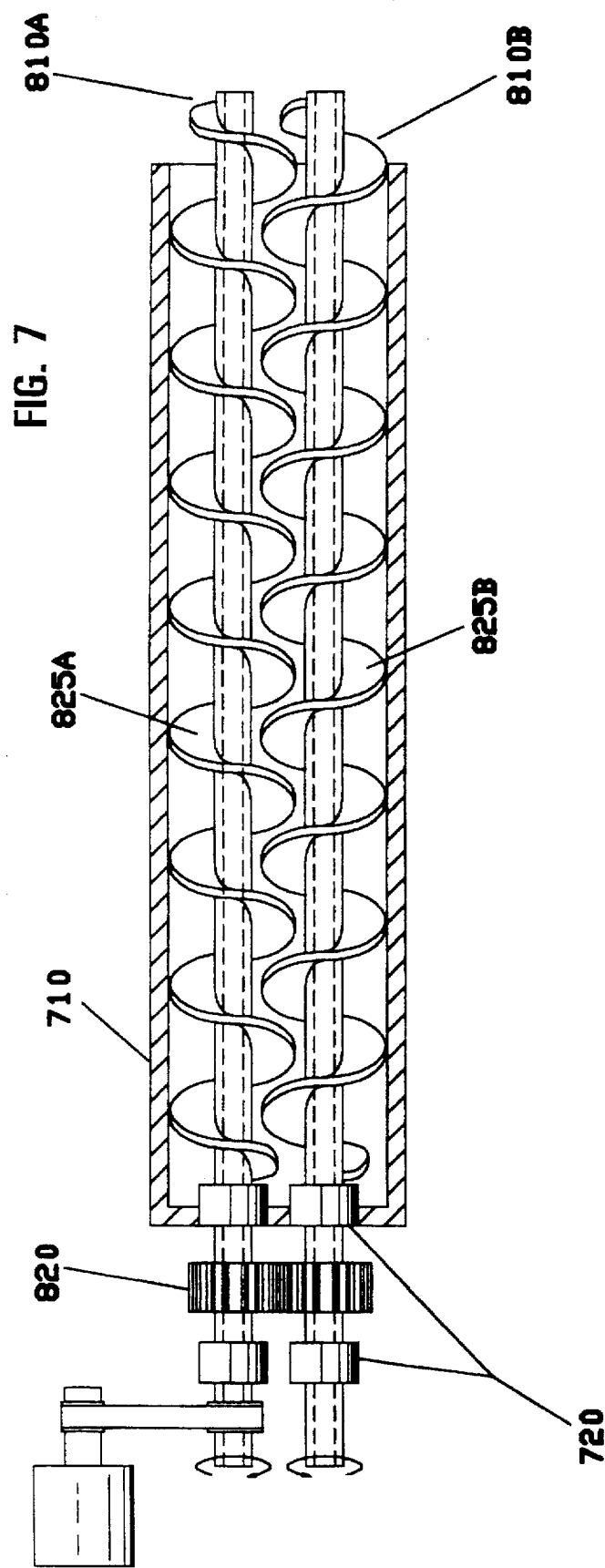
FIG. 7 is a section through cantilevered auger assembly 710 as shown on FIG. 6.

As further shown on FIG. 7, cantilevered auger assembly 710 is disclosed advantageously to comprise at least two counter-rotating augers 810A and 810B. The counter-rotation of augers 810A and 810B is enabled and synchronized by linkage means 820. From FIG. 7 and FIG. 8, it will be seen that flights 825A and 825B of augers 810A and 810B respectively spiral in opposite directions, so that when counter-rotated, augers 810A and 810B act to convey waste in a unitary direction.

FIG. 7 further illustrates that when counter-rotating augers 810A and 810A are brought together so that their flights 825A and 825B enmesh, said flights tend to become self-cleaning, as inter-flight occlusions of waste adhering to the flights of one auger will be picked up by the flights of the other auger.

Figure 8:
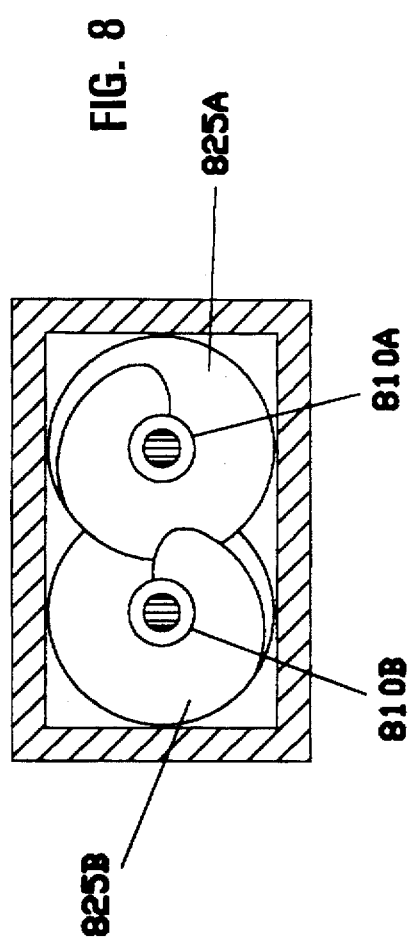
FIG. 8 is an end view of cantilevered auger assembly 710.

It will also be seen from FIG. 8 that the shafts of augers 810A and 810B may advantageously be hollow. In this way, air may be drawn through the hollow shafts of augers 810A and 810B under the influence of evacuating means 190 of FIG. 1, so as (1) to enable cooling of said shafts and (2) to encourage wider dispersal of waste into first combustion chamber 150.

FIG. 9 discloses incineration details in first combustion chamber 150. Waste is received through inlet 1010, dispersed as disclosed above. A predetermined portion 1020 of inner wall 1030 of first combustion chamber 150 is advantageously lined with a hard-wearing refractory so as to minimize internal damage from "flying waste" in the dispersal process.

Figure 9A:
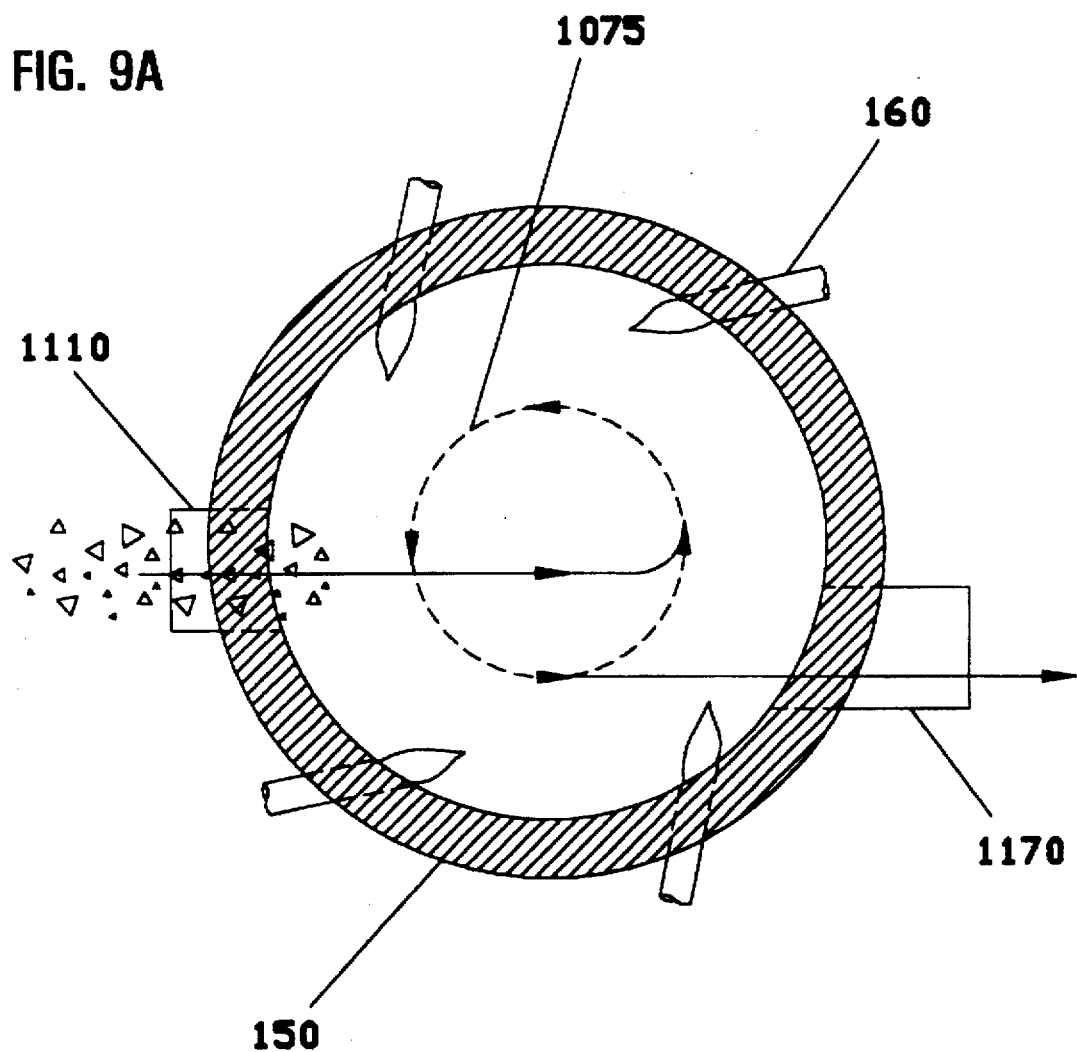
FIG. 9A is a sectional view as shown in FIG. 9.

As also shown on FIG. 9, first stage burners 160, and advantageously four thereof, incinerate waste into ash 1060 and combustion gas 1065. Ash 1060 is removed from first combustion chamber 150 as further described below. Combustion gas 1065 leaves first combustion chamber 150 through outlet 1070, having first travelled through first combustion chamber 150 in a spiraled path 1075. As further illustrated in FIG. 9A, the relative positions of inlet 1010, outlet 1070, and first stage burners 160 are tangentially located in a predetermined combination on first combustion chamber 150 to induce and maintain spiraled travel 1075 of combustion gas 1065.

Figure 10:
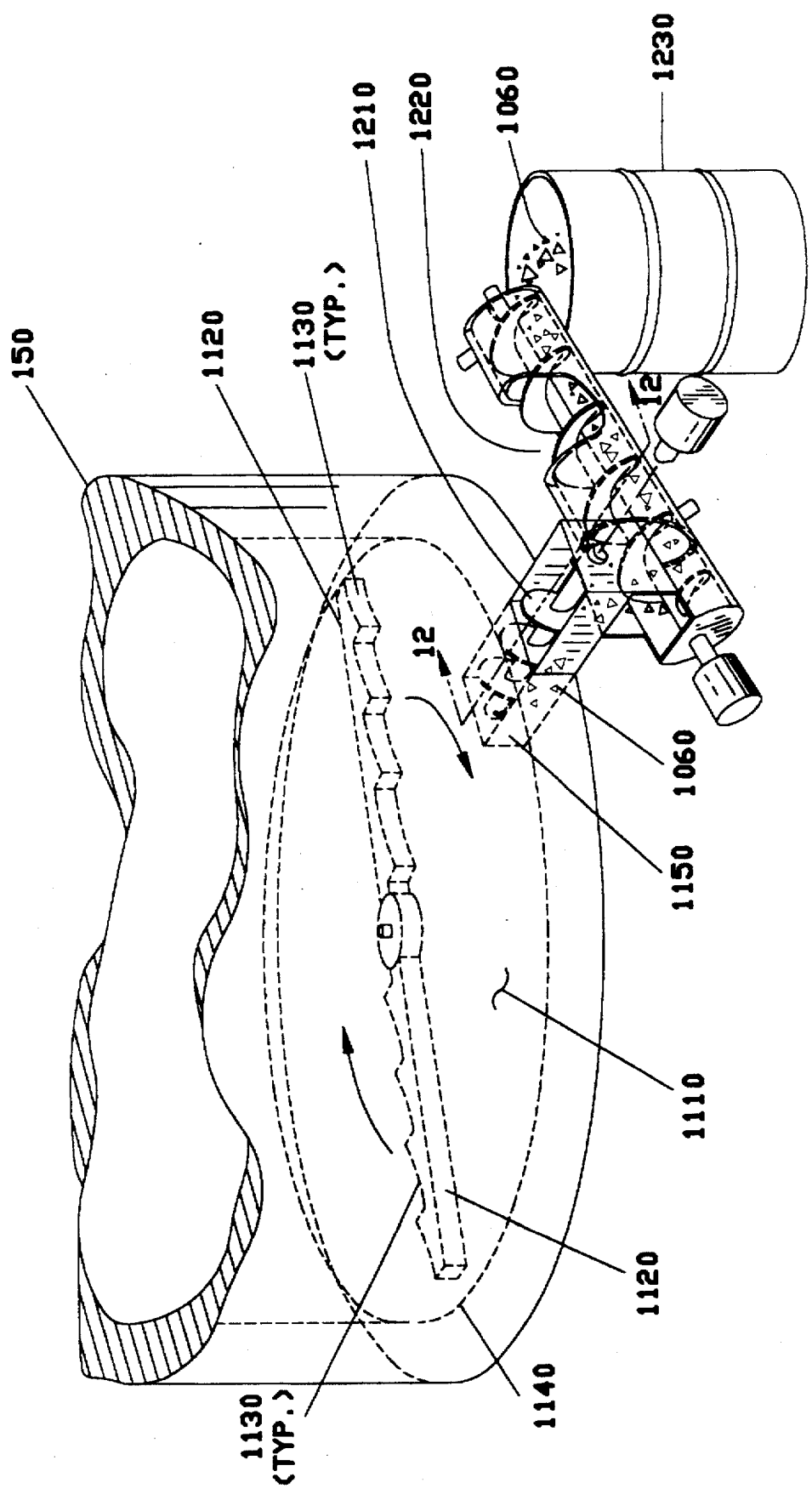
FIG. 10 shows one alternative embodiment for continuously removing ash from first combustion chamber 150.

Referring now to FIGS. 10, 11, 12, 12A, 13, 13A, 13B and 13C, various alternative embodiments are disclosed for continuous removal of ash 1060 from first combustion chamber 150. FIG. 10 shows first combustion chamber 150 with a hearth 1110 in which at least one, and advantageously two, rabble arms 1120 rotate. The rotational speed of rabble arms 1120 is advantageously less than 1 rpm. Rabble arras 1120 also advantageously provide vanes 1130 that, in cooperation with the rotation of rabble arms 1120, tend to encourage ash 1060 on hearth 1110 toward the perimeter 1140 of first combustion chamber 150.

Figure 11:
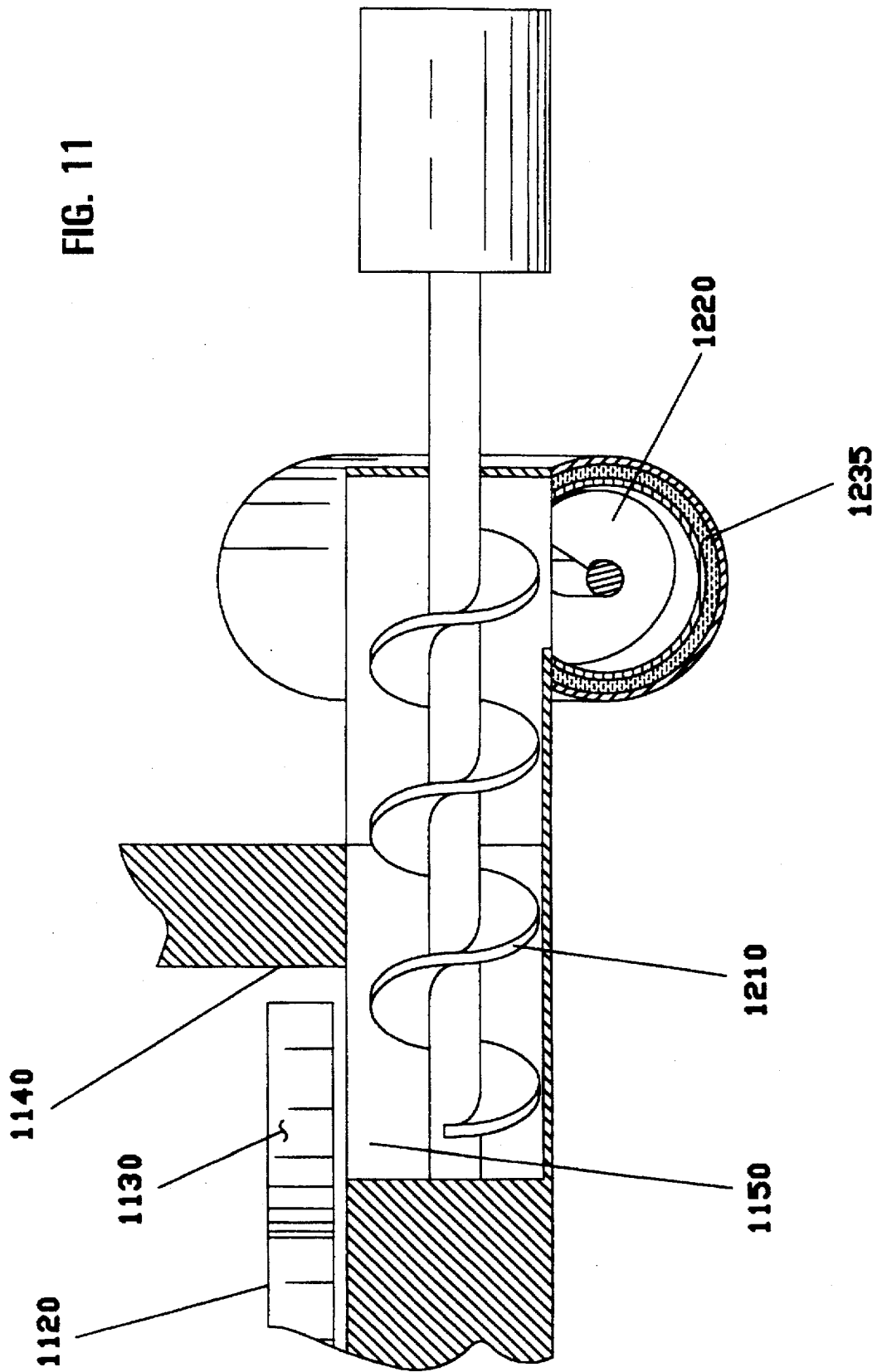
FIG. 11 is a sectional view as shown on FIG. 10.

Referring now to both FIG. 10 and FIG. 11, sump 1150 is recessed into hearth 1110, and is disposed to collect ash 1060 deposited therein by rabble arms 1120 rotating above. Hot ash conveyor means 1210, advantageously a hot service auger, transports ash 1060 collected in sump 1150 to off-site ash conveyor means 1220, again advantageously an auger. As shown on FIG. 10, and in more detail on FIG. 11, water jacket 1235 may be used to cool off-site ash conveyor means 1220, as well as ash 1060 transported thereon. As shown on FIG. 10, off-site ash conveyor means 1220 ultimately deposits ash 1060 in a suitable receptacle 1230 such as a 55-gallon drum.

Figure 12:
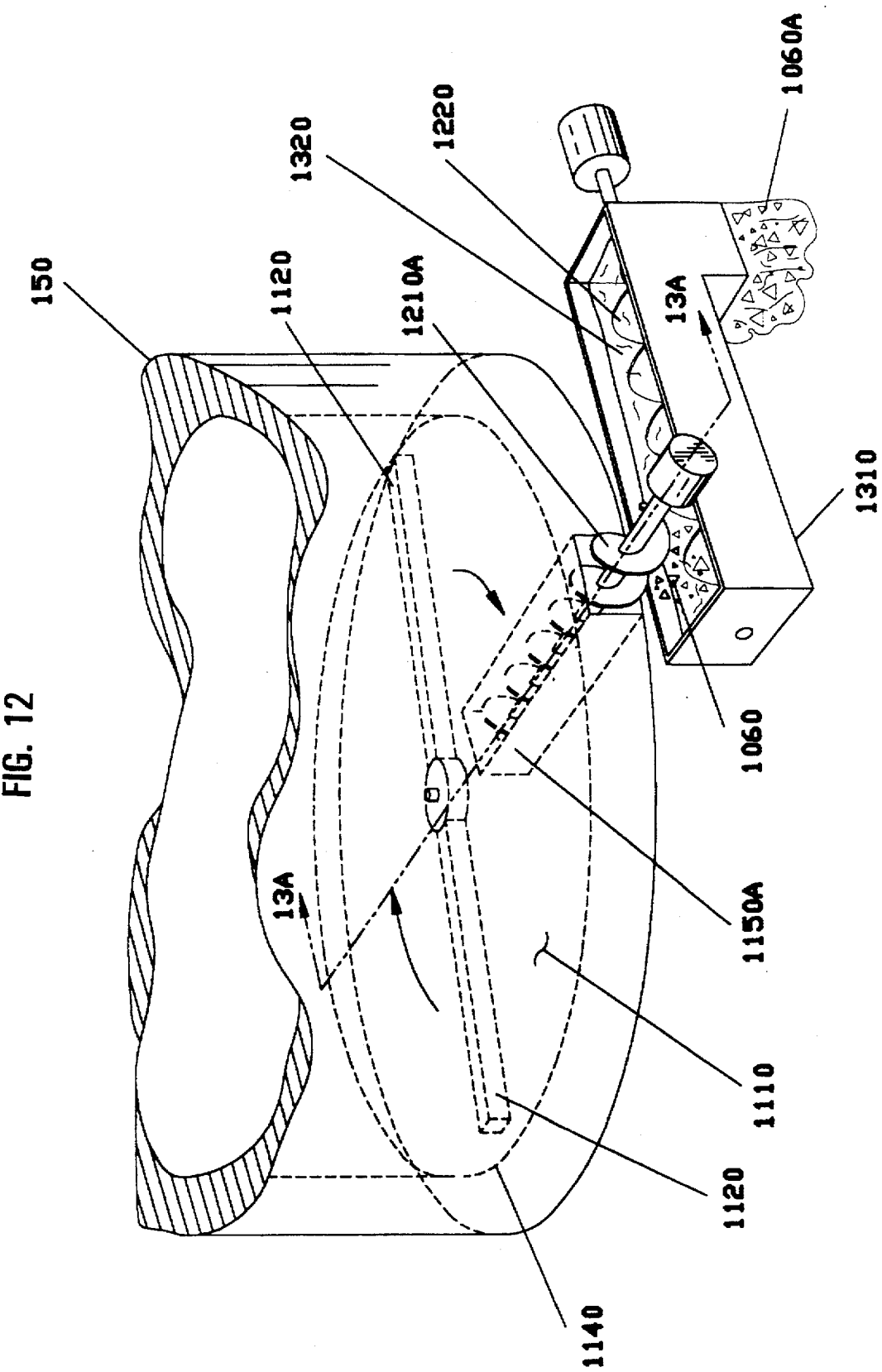
FIG. 12 shows another alternative embodiment for removing ash from first combustion chamber 150.

FIGS. 12 and 12A illustrate an alternative embodiment of removing ash 1060 from hearth 1110. In this embodiment, rabble arms 1120 merely rotate and do not deliberately encourage ash 1060 to perimeter 1140 of first combustion chamber 150. Accordingly, 1150A extends substantially farther into hearth 1110. Hot ash conveyor means 1210A is similarly longer to enable collection of ash deposited in sump 1150A.

FIGS. 12 and 12A also show an alternative means of cooling ash 1060 during transportation off-site. Off-site ash conveyor means 1220 is received within trough 1310 containing water 1320. When deposited into trough 1310, ash 1060 combines with water 1320 to form a cooled ash slurry 1060A that may be dried and then further transported off-site.

Figure 13:
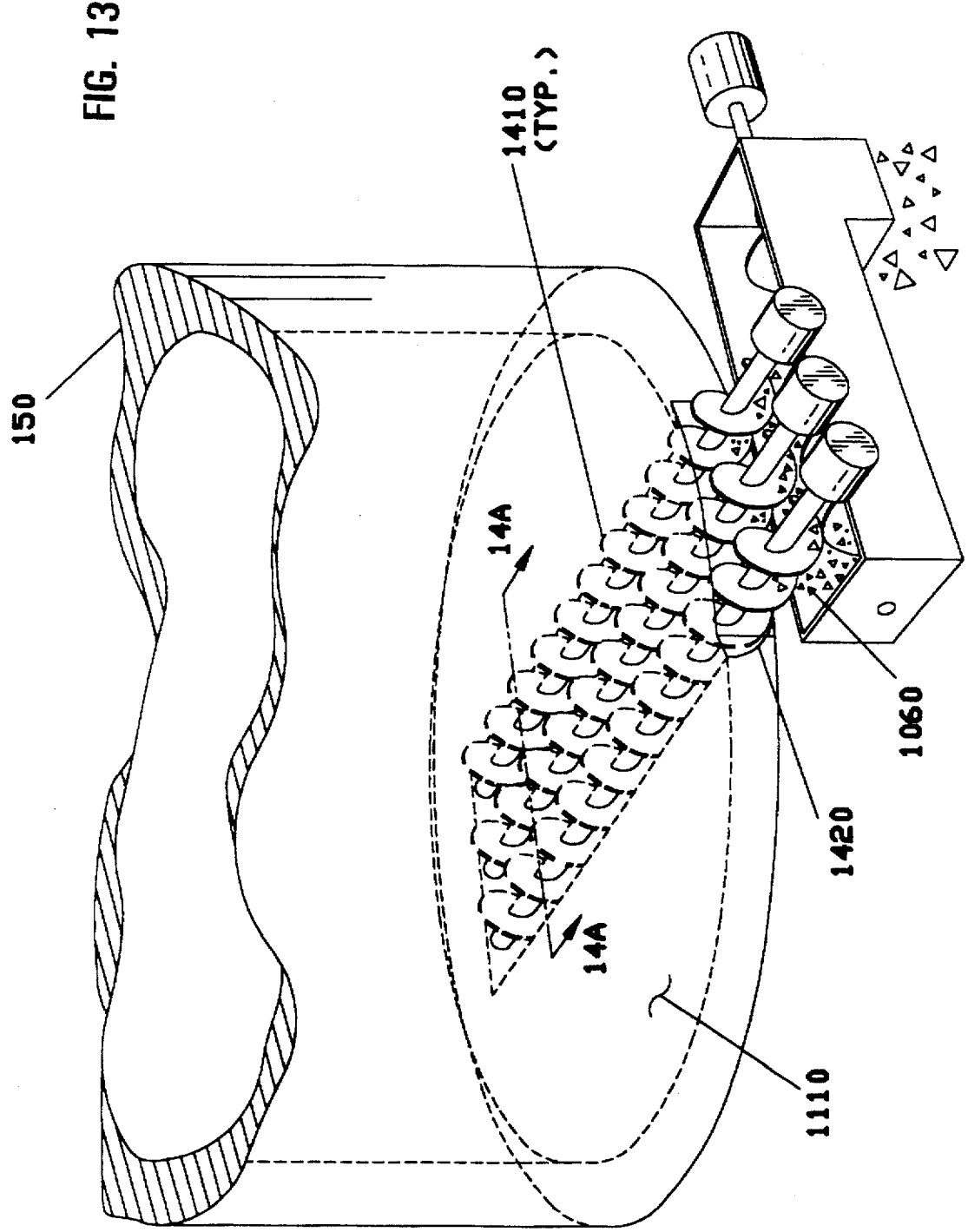
FIG. 13 shows yet another alternative embodiment for removing ash from first combustion chamber 150.
Figure 13A:
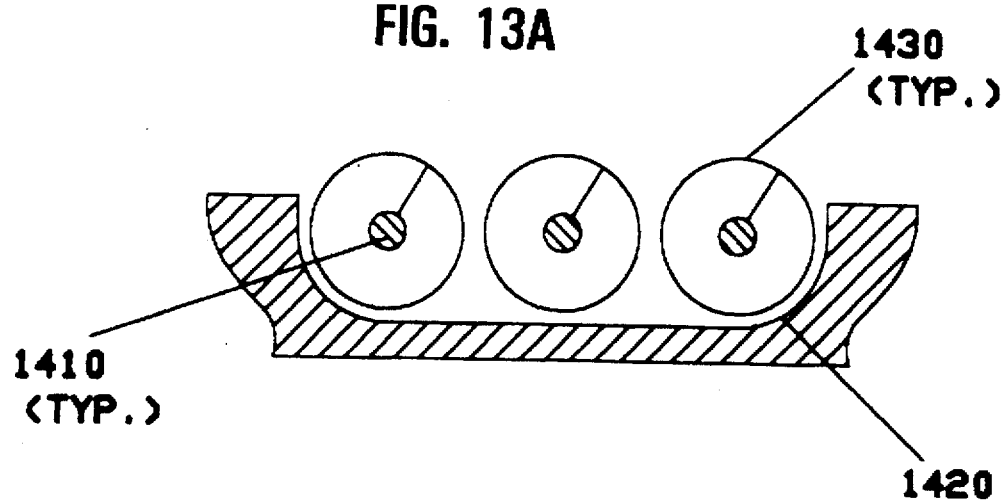
FIG. 13A is a sectional view as shown on FIG. 13.
Figure 13B:
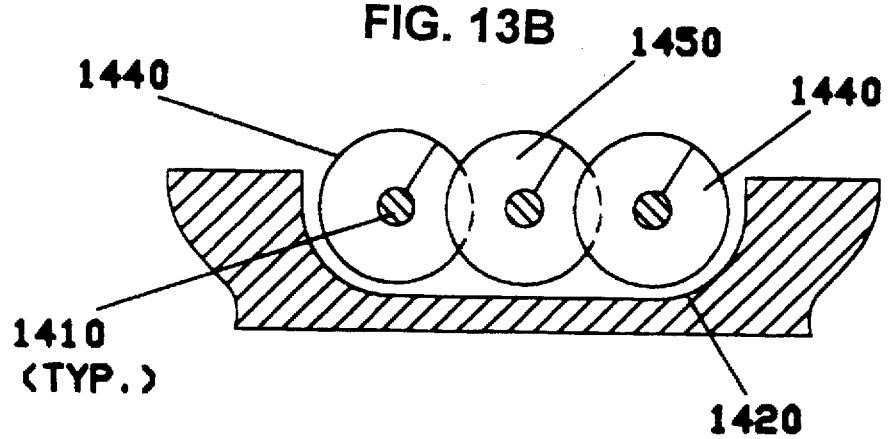
FIG. 13B illustrates an alternative auger arrangement to the arrangement shown in FIG. 13A.

FIGS. 13, 13A, 13B and 13C illustrate further alternative embodiments directed to removing ash 1060 from hearth 1110 in first combustion chamber 150. These embodiments disclose multiple augers 1410 distributed in hearth 1110 to remove ash 1060. In each case, sump 1420 is recessed in hearth 1110, and is of a suitable size and depth to accommodate augers 1410. As illustrated on FIGS. 13A, 13B and 13C, augers 1410 may advantageously be of varying configurations. FIG. 13A shows flights 1430 of auger 1410 separated. Alternatively, FIG. 13B shows flights 1440 and 1450 of augers 1410 enmeshed. Further, with particular reference to FIG. 13B, flights 1450 may be disposed both to spiral in the opposite direction and to counter-rotate from flights 1440. In this way, flights 1440 and 1450 will be tend to be self-cleaning as described analogously above with respect to flights 825A and 825B on augers 810A and 810B on FIGS. 7 and 8.

Figure 13C:
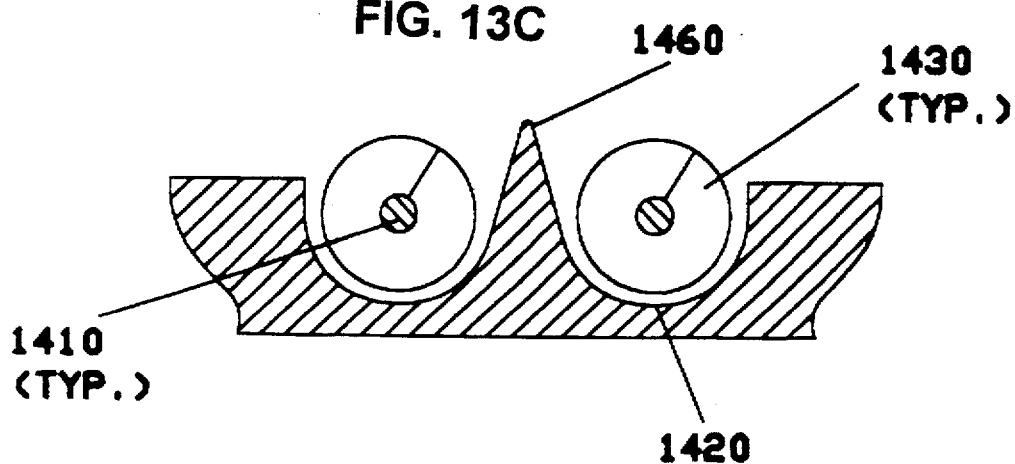
FIG. 13C shows yet another alternative arrangement of ash-removing augers to FIG. 13A.

A further embodiment is disclosed on FIG. 13C, in which sloped divider 1460 separates augers 1410 within sump 1420. Sloped divider 1460 tends to direct ash 1060 into flights 1430.

Figure 14:
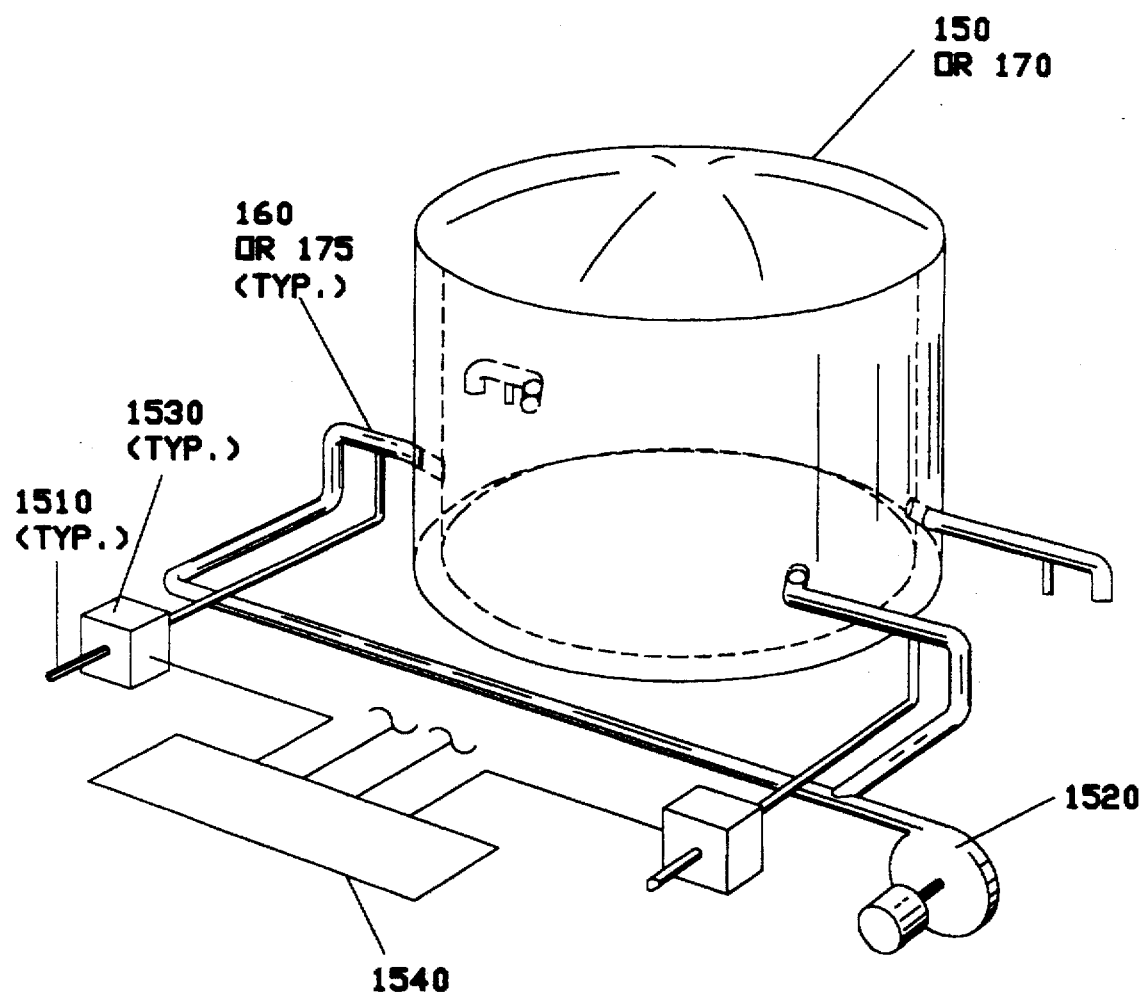
FIG. 14 is a perspective view of the present invention's details to control extinguishing and re-igniting burners 160 on first combustion chamber 150 or second combustion chamber 170 respectively.

Referring now to FIG. 14, the details of the present invention's control of fuel and air to first stage burners 160 and second stage burners 175 are disclosed. It will be understood that analogous details apply both to first stage burners 160 within first combustion chamber 150, and second stage burners 175 within second combustion chamber 170.

Fuel and oxygen is supplied to burners 160/175 by fuel supply 1510 and oxygen supply 1520 respectively. Fuel supply cut-off means 1530, operated by control means 1540, may be engaged to completely shut off fuel supply 1510 and extinguish burners 160/175 if desired. Use of control means 1540 to extinguish burners 160/175 in this way may be enabled during combustion when combustion temperatures become sufficiently high for waste to be self-incinerating without the need for assistance from burners 160/175.

By extinguishing burners 160/175 in this way, more oxygen becomes available for rapid combustion. Previously, burners were turned to low-fire position when waste became self-incinerating, and pilot flames were typically left alight. Such burners in low-fire position, in combination with pilot flames, necessarily consumed oxygen. The present invention's feature of shutting down fuel supply 1510 completely and extinguishing burners 160/175 creates the advantage of making even more oxygen available to the combustion of waste, thereby encouraging rapid incineration.

When burners 160/175 are desired to be reignited, control means 1540 reactivates fuel supply 1510. The ambient temperature within combustion chamber 150/175 re-ignites burners 160/175. Flame safety instrumentation, standard in the art, prevents accumulation of unignited combustion fuel.

Figure 15:
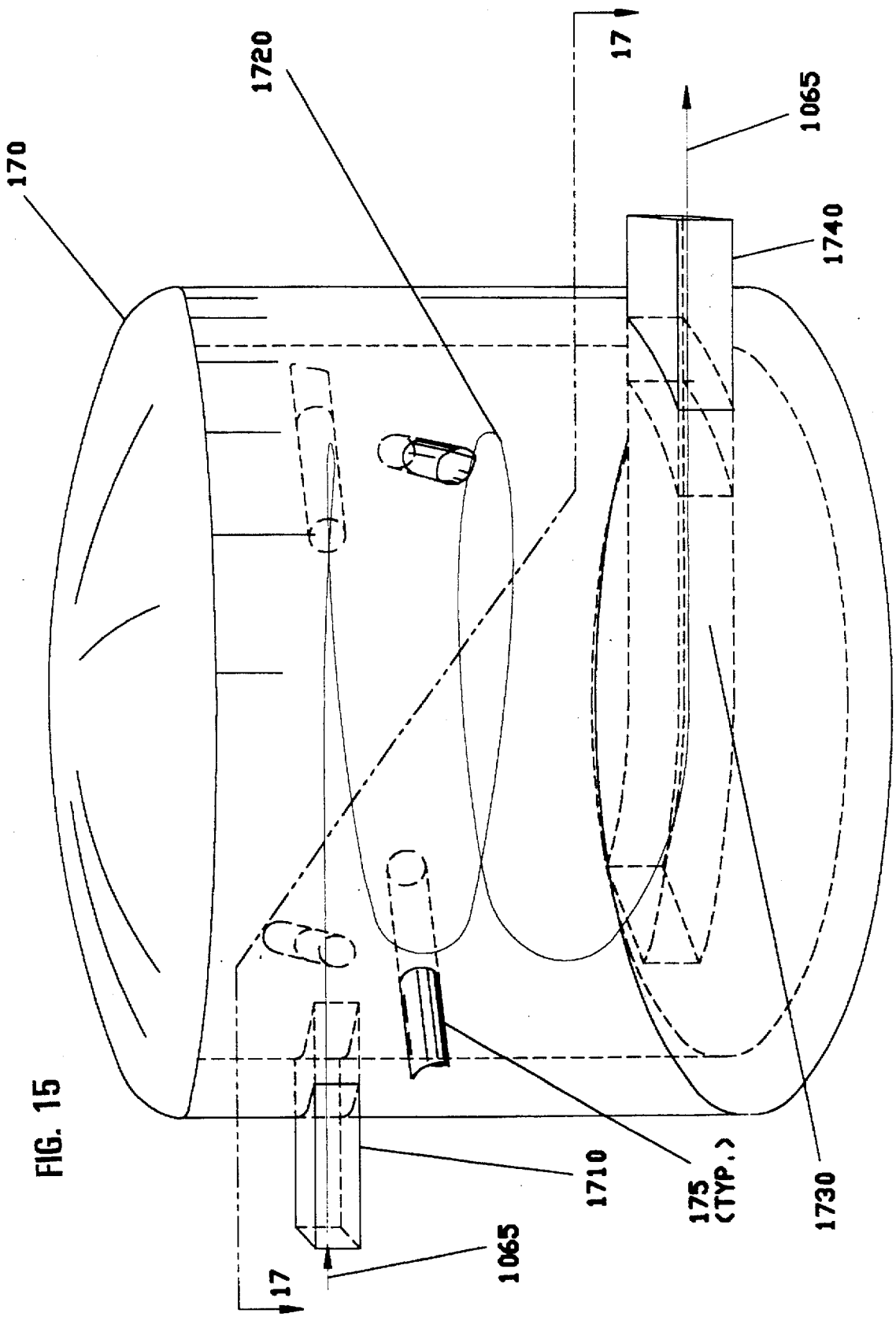
FIG. 15 is a perspective view illustrating details within second combustion chamber 170.
Figure 16:
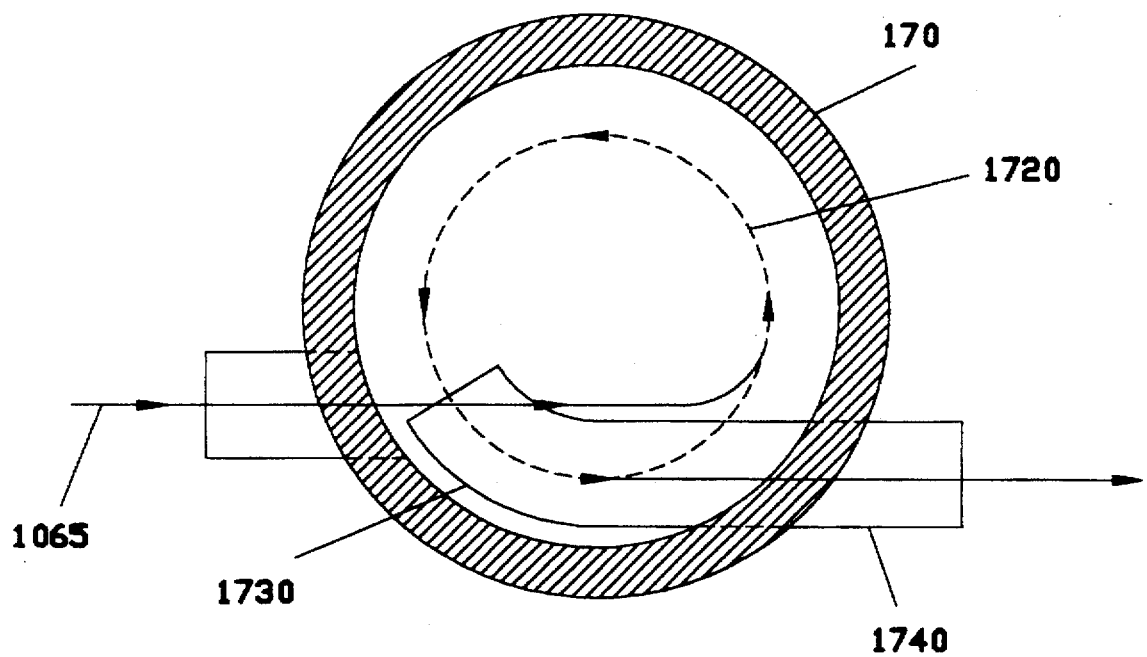
FIG. 16 is a sectional view also as shown on FIG. 15.
Figure 17A:
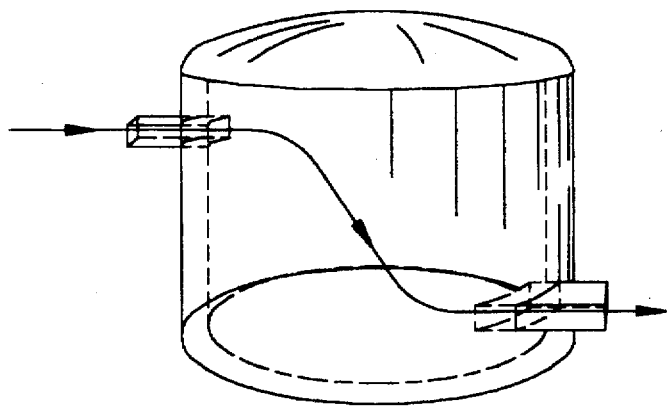
FIG. 17A illustrates the substantially straight pass-through of gas 1065 through second combustion chamber 170 that the present invention seeks to avoid.
Figure 18:
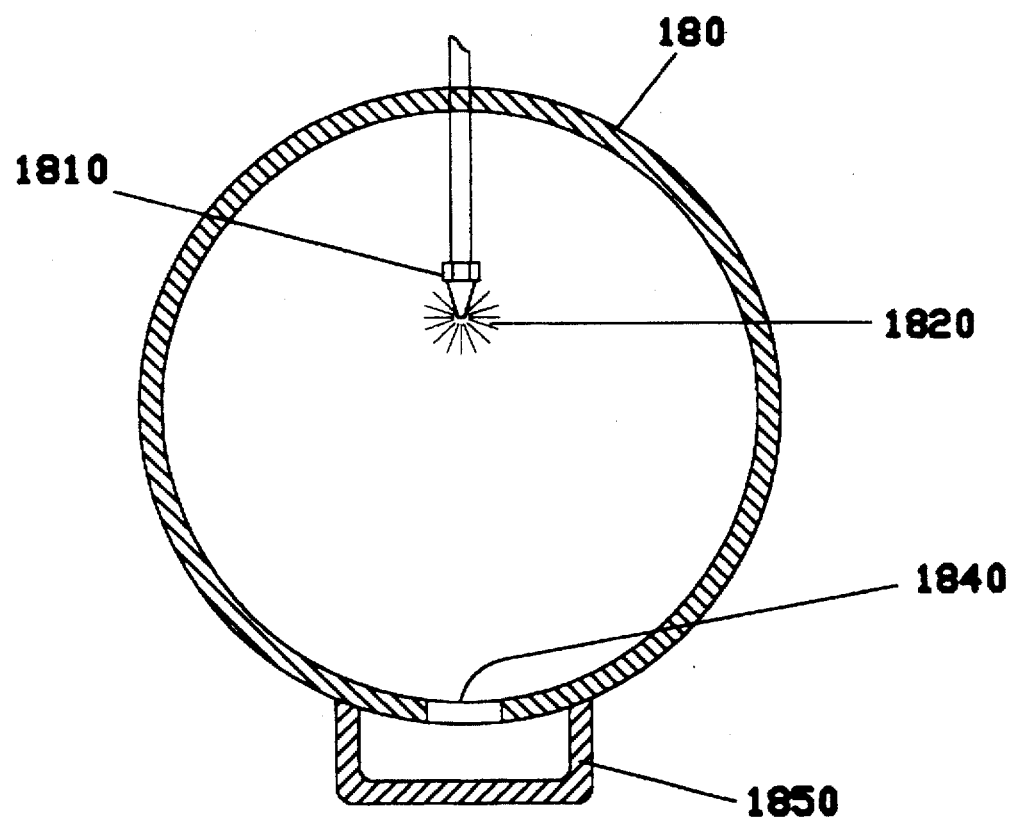
FIG. 18 is a sectional view as shown on FIG. 17.

FIGS. 15, 16 and 16A illustrate the further incineration of gas 1065 in second combustion chamber 170. According to FIG. 15, least one second stage burner 175, and again advantageously four thereof, enables further combustion of gas 1065 entering second combustion chamber 170 through inlet 1710. As illustrated analogously within first combustion chamber 150 on FIG. 9, FIG. 15 shows gas 1065 encouraged to travel through second combustion chamber 170 in a spiral path 1720. Analogous to FIG. 9A described above, a pre-determined tangential location of second stage burners 175 and inlet 1710 on second combustion chamber 170 advantageously induces and maintains spiral path 1720 of gas 1065. Spiral path 1720 is further encouraged by internal collector 1730 attached to outlet 1740 of second combustion chamber 170. As further illustrated in FIG. 16, internal collector 1730 extends outlet 1740 into a pre-determined position within second combustion chamber 170. In this way, the undesired tendency of gas 1065 to pass straight through second combustion chamber 170 without first having travelled spiral path 1720, as illustrated in FIG. 17A, will be minimized, since gas 1065 must travel spiraled path 1720 in order ultimately to enter internal collector 1730. By inducing and maintaining spiraled travel 1720 of gas 1065 in this manner, regulatory residence time of gas 1065 within second combustion chamber 170 can be facilitated.

Referring now to FIG. 17, it will be understood that gas 1065, now further incinerated in second combustion chamber 170, passes into quench tube 180 to be cooled. Quench tube 180 provides at least one nozzle 1810 dispensing coolant droplets (advantageously water) in the form of fog 1820. Gas 1065 passes through fog 1820, absorbing coolant droplets, and thus cooling evaporatively to form quenched gas 1830.

Nozzles 1810 advantageously dispense fog 1820 in sufficient quantity to oversaturate gas 1065 as it passes. Accordingly, at least one hole 1840 is provided in the bottom of quench tube 180, through which excess condensates may drain into inclined sump 1850. Quench drain 1860 collects excess condensates from inclined sump 1850 and transports said excess condensates to reservoir 1870.

Figure 19:
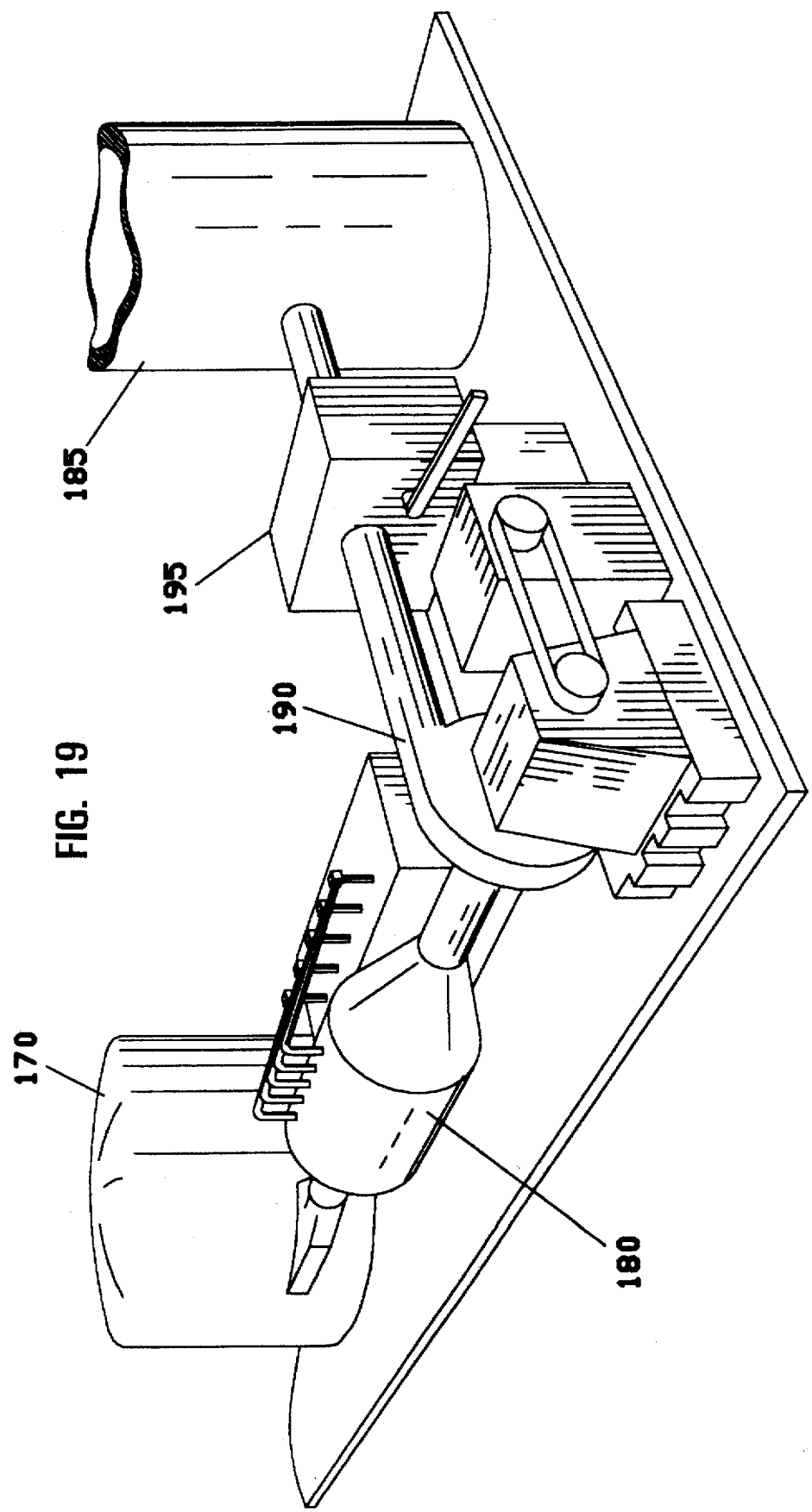
FIG. 19 is a perspective partial view of system 100, with evacuator means 190 in the foreground of the illustration.

Referring momentarily to FIG. 1 and FIG. 19, it will be noted that evacuator means 190 imparts and maintains a negative pressure within quench tube 180. Accordingly, as shown on FIG. 17, quench drain 1860 and reservoir 1870 are advantageously maintained at a pre-determined hydrostatic head 1880 relative to inclined sump 1850 in order to prevent condensate from being sucked back from reservoir 1870 into inclined sump 1850 by the negative pressure within quench tube 180.

FIG. 19 shows evacuator means 190 located between quench tube 180 and wet scrubber 185 so as to draw air through components upstream of the evacuator means 190, including first combustion chamber 150, second combustion chamber 170, and quench tube 180. FIG. 19 also discloses louvers 195 used to control the volume of air drawn through by evacuator means 190.

Figure 20:
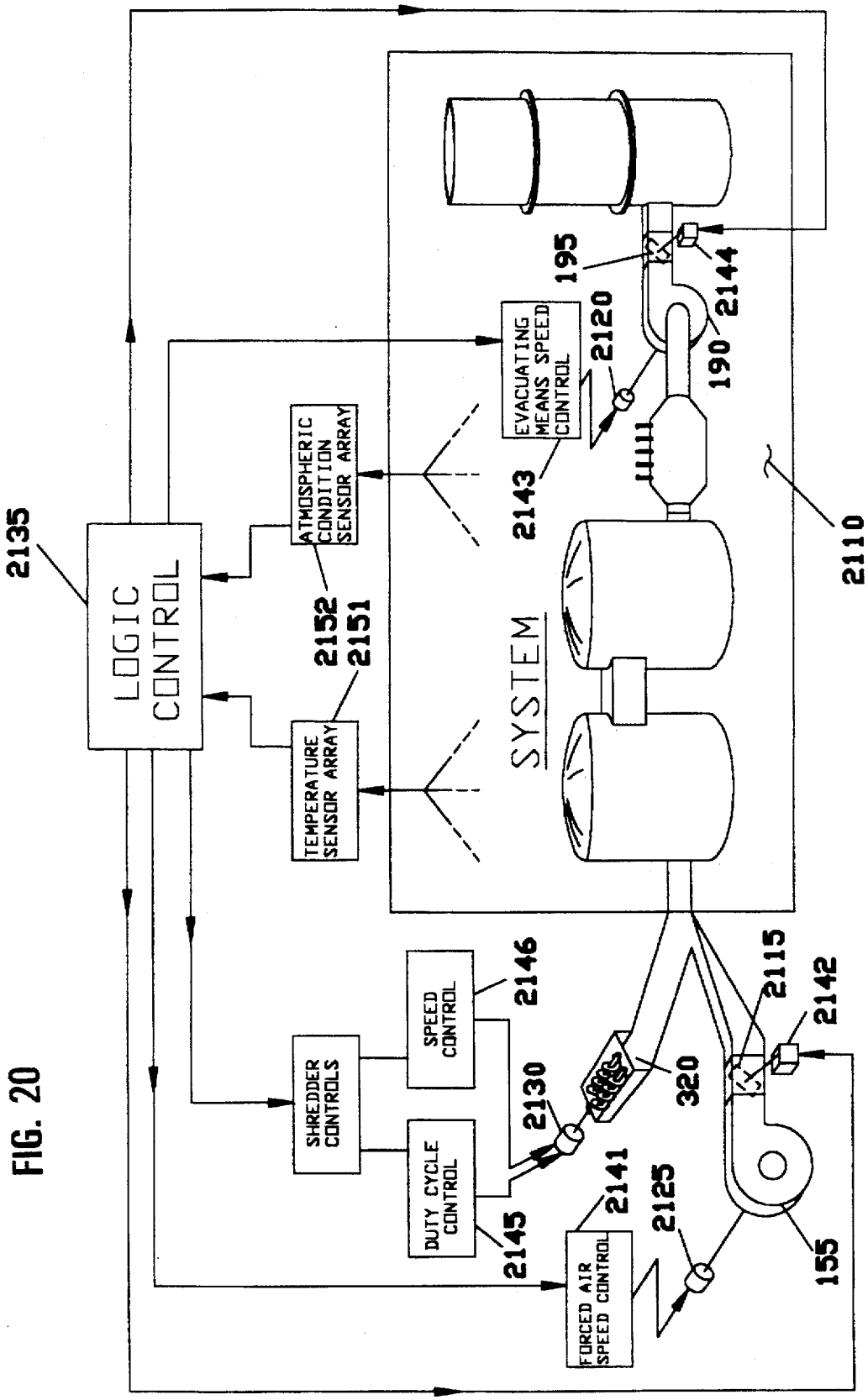
FIG. 20 is a schematic illustrating the present invention's preferred arrangement for controlling sustained continuous combustion with information feedback loops between the system's operational controls and sensing devices monitoring characteristics of combustion in progress.

FIG. 20 is a schematic disclosing a preferred embodiment of the combustion control features of the present invention. As described more specifically above, shredder 320 feeds waste into combustion/cooling system 2110, generally comprising first combustion chamber 150, second combustion chamber 170, quench tube 180 and wet scrubber 185. Evacuating means 190 draws air continuously through combustion/cooling system 2110. When evacuating means 190 and forced air supply 155 are advantageously fans, as shown on FIG. 20, louvers 195 and 2115 control volumetric throughput of evacuating means 190 and forced air supply 155 respectively. Similarly, when evacuating means 190 and forced air supply 155 are advantageously fans, fan motors 2120 and 2125 control speed thereof respectively.

The operation of shredder 320 may be utilized to regulate flow rate of waste into combustion/cooling system 2110. Shredder motor 2130 may be controlled advantageously either according to rotational speed or duty cycle, or both, in regulating the rate at which shredded waste may be made available to combustion/cooling system 2110.

Logic control 2135 simultaneously but independently controls speed control 2141 for fan motor 2125, position control 2142 for fan louvers 2115, speed control 2143 for fan motor 2120, position control 2144 for fan louvers 195, duty cycle control 2145 for shredder motor 2130, and speed control 2146 for shredder motor 2130. Temperature sensor array 2151 feeds information to logic control 2135 regarding the ambient temperature within combustion/cooling system 2110 during operation. Similarly, atmospheric condition sensor array 2152 feeds information to logic control 2135 regarding atmospheric conditions within combustion/cooling system 2110 during operation, such as oxygen or carbon monoxide levels. Logic control 2135 modulates controls 2141, 2142, 2143, 2144, 2145 or 2146 according to information received from sensor arrays 2151 or 2152.

The present invention has been shown, described and illustrated in substantial detail with reference to at least one presently preferred embodiment. However, it will be understood by those skilled in the art that changes and modifications may be made without departing from the spirit and scope of the present invention, which is defined by the claims sent forth hereunder.

We claim:

1. In combination with waste to be processed, a waste processor, comprising:

means for reducing particle size of the waste;

mechanical means for propelling waste into a first combustion chamber;

first incinerating means, the first incinerating means disposed within the first combustion chamber to incinerate waste into gas and ash;

means for encouraging said gas to travel through the first combustion chamber in a spiralled path;

a second combustion chamber, the second combustion chamber in gas flow communication with the first combustion chamber;

second incinerating means, the second incinerating means disposed within the second combustion chamber to further incinerate said gas;

means for encouraging said gas to travel through the second combustion chamber in a spiralled path;

a quench tube, the quench tube in gas flow communication with the second combustion chamber;

means for cooling said gas within the quench tube; and evacuating means, said evacuating means disposed to forcibly evacuate the first combustion chamber, the second combustion chamber and the quench tube to impart a substantially constant negative pressure throughout;

whereby the negative pressure tends to draw air into the waste processor, replenishing oxygen.

2. The waste processor of claim 1, wherein the means for reducing particle size of the waste includes:

a shredder; and means for conveying shredded waste into the first combustion chamber;

whereby waste combustion may be facilitated by reducing particle size.

3. The waste processor of claim 2, further comprising:

a feed arm, the feed arm disposed to encourage waste into the shredder, the feed arm providing at least one stress concentrator thereon at the point of contact with waste;

whereby larger-sized and awkwardly-shaped waste pieces may be crushed.

4. The waste processor of claim 1, wherein the mechanical means for propelling waste into the first combustion chamber also includes a broadcaster, whereby waste may be dispersed more widely throughout the first combustion chamber by the broadcaster.

5. The waste processor of claim 4, wherein the broadcaster further comprises:

at least one vane, the at least one vane rotating within the broadcaster and disposed to physically propel waste deposited thereon.

6. The waste processor of claim 5, further comprising:

confining means, the confining means disposed to encourage waste to remain in contact with the at least one vane during rotation thereof;

whereby the confining means deters waste from losing contact with the at least one vane.

7. The waste processor of claim 1, wherein the mechanical means for propelling waste into the first combustion chamber also includes:

a cantilevered auger assembly, the cantilevered auger assembly having at least one auger, the cantilevered auger assembly supported from outside the first combustion chamber to allow the at least one auger to cantilever into the first combustion chamber;

whereby the supports for the cantilevered auger assembly need not be designed for hot service.

8. The waste processor of claim 1, wherein the mechanical means for propelling waste into the first combustion chamber also includes:

a multiple auger assembly, the multiple auger assembly having a plurality of cooperating augers;

each auger having flights with predetermined pitch and travel direction, each auger also located relative to the other augers to allow its flights to enmesh with the flights of at least one other auger; and the direction of rotation of each auger being predetermined so that in combination with each auger's respective flights, waste will travel along the multiple auger assembly in a unitary direction when all augers are rotated simultaneously, wherein the enmeshing of auger flights encourages self-cleaning thereof during rotation thereof, and wherein the cooperating augers in combination also encourage wider dispersal of waste.

9. The waste processor of claim 1, wherein the mechanical means for propelling waste into the first combustion chamber also includes:

at least one auger, one or more of said augers having a hollow shaft;

whereby air may be drawn through said hollow shaft or shafts.

10. The waste processor of claim 1, further comprising:

a hopper, the hopper having an entrance and an exit for waste; the hopper also having first and second lids disposed about the entrance, the first and second lids independently operable by remote means, said operation of first and second lids including cooperation thereof to form a chute leading into the entrance of the hopper;

whereby the waste may be handled with a reduced need for physical human contact therewith.

11. The waste processor of claim 1, wherein the first combustion chamber includes a means for continuously removing ash therefrom during incineration, whereby combustion need not be paused periodically to remove ash.

12. The waste processor of claim 11, wherein the first combustion chamber includes a hearth, and the means for continuously removing ash from the first combustion chamber includes:

a sump, the sump located in the hearth; and hot ash conveyor means, the hot ash conveyor means located in the sump and disposed to remove hot ash from the sump.

13. The waste processor of claim 12, wherein the hot ash conveyor means is at least one auger.

14. The waste processor of claim 13, wherein:

each auger has flights with predetermined pitch and travel direction, each auger also being located relative to the other augers to allow its flights to enmesh with the flights of at least one other auger; and the direction of rotation of each auger being predetermined so that in combination with each auger's respective flights, ash will be conveyed in a unitary direction when all augers are rotated simultaneously.

15. The waste processor of claim 12, further comprising:

a rabble arm, the rabble arm disposed to operate within the hearth to encourage ash into the sump.

16. The waste processor of claim 15, wherein the rabble arm has at least one vane, the at least one vane cooperating with the operation of the rabble arm to encourage ash into the sump.

17. The waste processor of claim 11, wherein the means for continuously removing ash from the first combustion chamber also includes a means for cooling said ash.

18. The waste processor of claim 17, wherein the means for cooling said ash includes a water jacket.

19. The waste processor of claim 17, wherein the means for cooling said ash includes a water trough.

20. The waste processor of claim 1, wherein the means for cooling said gas includes a means for generation and dispersal of droplets, and the quench tube further comprises:

a quench sump, the quench sump collecting excess droplets into a quench drain, the quench drain artificially maintained at a predetermined hydrostatic pressure;

whereby the quench drain removes excess droplets from the quench sump, while the predetermined hydrostatic pressure counterbalances the negative pressure imparted into the quench tube by the evacuating means so as to discourage said negative pressure from drawing previously drained droplets back into the quench tube.

21. The waste processor of claim 1, wherein the means for encouraging said gas to travel through the first combustion chamber in a spiralled path further includes:

a first combustion chamber inlet and a first combustion chamber outlet, the outlet enabling said gas flow communication with the second combustion chamber, the location on the first combustion chamber of the first incinerating means being predetermined to encourage a spiralled travel of said gas within the first combustion chamber.

22. The waste processor of claim 1, wherein the means for encouraging said gas to travel through the second combustion chamber in a spiralled path further includes:

a second combustion chamber inlet and a second combustion chamber outlet, the second combustion chamber inlet enabling said gas flow communication with the first combustion chamber, the second combustion chamber enabling said gas flow communication with the quench tube; and the second combustion chamber also having an internal extension duct, the internal extension duct having an entrance, said entrance residing at a predetermined location inside the second combustion chamber, the relative locations on the second combustion chamber of the inlet and the second incinerating means and the entrance to the internal extension duct being predetermined to encourage a spiralled travel of said gas within the second combustion chamber.

23. In combination with waste to be processed, a method of continuously processing waste, comprising the steps of:

(a) shredding the waste;

(b) dispersing the waste throughout a first combustion chamber;

(c) incinerating the waste into ash and gas;

(d) removing the ash from the first combustion chamber while incineration therein continues;

(e) encouraging the gas to travel in a spiralled path through the first combustion chamber and into a second combustion chamber;

(f) further incinerating the gas upon its arrival in the second combustion chamber;

(g) encouraging the gas to travel in a spiralled path through the second combustion chamber and into a quench tube;

(h) cooling the gas upon its arrival in the quench tube using an evaporative cooling technique; and (i) imparting a negative pressure throughout the first combustion chamber, the second combustion chamber and the quench tube;

whereby the negative pressure tends to draw fresh air into the first and second combustion chambers and tends to encourage a continuous flow of waste.

24. The method of claim 23, further comprising the steps of:

initially providing a hopper with lids to direct waste towards the first combustion chamber; and combining the lids to also form a chute down which waste may deposited into the hopper;

whereby use of the chute may minimize human contact with waste being deposited into the hopper.

25. The method of claim 23, wherein step (b) includes the step of broadcasting the waste throughout the first chamber.

26. The method of claim 23, wherein step (b) includes the steps of:

conveying waste into the first combustion chamber on at least one auger;

hollowing out the shaft of the at least one auger; and allowing air to flow through the at least one hollow auger shaft and into the first combustion chamber;

whereby the air allowed to flow into the chamber through the at least one hollow auger shaft (1) tends to disperse waste wider within the first combustion chamber; (2) tends to cool the at least one auger; and (3) replenishes oxygen available for combustion within said chamber.

27. The method of claim 23, wherein step (b) includes the steps of:

initially providing at least one auger;

cantilevering the auger into the first combustion chamber; and depositing waste onto the auger outside the first combustion chamber;

whereby supports for the cantilevered auger need not be designed for hot service.

28. The method of claim 23, wherein step (b) includes the steps of:

initially providing a plurality of augers each with flights;

rotating at least one auger clockwise and at least one auger counterclockwise;

inverting the flight direction of each clockwise-rotating auger from the flight direction of each counterclockwise-rotating auger;

enmeshing the flights of each clockwise-rotating auger with the flights of at least one counterclockwise-rotating auger;

depositing waste upon the enmeshed flights; and operating the augers in combination to provide a unitary direction of waste along the flights into the first chamber;

whereby the auger flights tend to clean each other during combined operation thereof.

29. The method of claim 23, wherein step (d) includes the steps of:

initially providing a hearth in the first combustion chamber;

initially sinking a sump into the hearth;

initially placing a hot ash conveyor means in the sump;

encouraging ash into the sump during incineration; and removing ash from the sump with the hot ash conveyor means;

whereby incineration need not be interrupted to remove ash buildup from the first combustion chamber.

30. The method of claim 23, wherein step (d) includes the step of cooling the ash.

31. The method of claim 23, wherein step (e) further includes the steps of:

initially providing the first combustion chamber with an inlet and an outlet and a burner means; and locating said burner means in a predetermined position on the first combustion chamber;

whereby the predetermined position of said burner means encourages spiralled travel of waste.

32. The method of claim 23, wherein step (g) further includes the steps of:

initially providing the second combustion chamber with an inlet and an outlet and a burner means and an internal duct open at first and second ends;

connecting the first end of the internal duct to the outlet;

locating the second end of the internal duct at a predetermined location within the second combustion chamber; and locating the inlet and the burner means and the second end of the internal duct at predetermined relative positions;

whereby the predetermined relative positions of said inlet and burner means and second end of said internal duct cooperate to encourage spiralled travel of waste.

33. The method of claim 23, wherein step (h) includes the step of spraying droplets on the gas, whereby the gas is encouraged to cool evaporatively.

34. The method of claim 33, wherein the step of spraying droplets on the gas further includes the step of oversaturating the gas with said droplets.

35. The method of claim 34, wherein the step of oversaturating the gas further includes:

initially providing a quench sump in the quench tube;

initially providing a quench drain in the quench sump;

collecting excess droplets in the quench sump;

draining excess droplets from the quench tube through the quench drain; and artificially maintaining the quench drain at a predetermined hydrostatic pressure;

whereby the predetermined hydrostatic head pressure counterbalances the negative pressure imparted into the quench tube so as to discourage said negative pressure from drawing previously drained droplets back into the quench tube.

36. In combination with waste to be processed, a continuous waste processor, comprising:

a hopper, the hopper having an entrance and an exit for waste, the hopper also having first and second lids disposed about the entrance, the first and second lids independently operable by remote means, said operation of first and second lids including cooperation thereof to form a chute leading into the entrance of the hopper;

a shredder, the shredder disposed at the exit of the hopper;

a feed arm, the feed arm located inside the hopper and disposed to encourage waste into the shredder, the feed arm providing at least one stress concentrator thereon at the point of contact with waste;

shredded waste conveyer means, the shredded waste conveyer means in shredded waste communication with the shredder, the shredded waste conveyor means including a broadcaster, the broadcaster disposed to disperse waste from the shredded waste conveyor means into a first combustion chamber through a first chamber inlet therein;

the first combustion chamber also having a first chamber outlet and a hearth and an interior surface, a predetermined portion of the interior surface lined with a hard-wearing refractory, the hearth having a sump, the sump containing hot ash conveyer means, the hot ash conveyer means including an ash cooling means;

at least one first stage burner, each first stage burner disposed to incinerate waste dispersed within the first combustion chamber into gas and ash, the relative locations on the first combustion chamber of the at least one first stage burner and the first chamber inlet and the first chamber outlet being predetermined to encourage spiralled travel of waste within the first combustion chamber during incineration thereof;

a rabble arm, the rabble arm disposed to operate over the hearth, the rabble arm having at least one vane, the at least one vane cooperating with the operation of the rabble arm to encourage the ash into the sump in the hearth;

a second combustion chamber, the second combustion chamber having a second chamber inlet, the second chamber inlet in gas communication with the first chamber outlet, the second chamber also having a second chamber outlet, the second chamber outlet having an internal extension duct, the internal extension duct having an entrance, said entrance residing at a predetermined location inside the second combustion chamber;

at least one second stage burner, each second stage burner disposed to further incinerate gas travelling from the first combustion chamber, the relative locations on the second combustion chamber of the at least one second stage burner and the second chamber inlet and the entrance to the internal extension duct being predetermined to encourage spiralled travel of gas within the second combustion chamber during incineration thereof;

a quench tube, the quench tube having a quench inlet and a quench outlet, the quench inlet in gas communication with the second chamber outlet, the quench tube providing droplet generation and dispersal means, said droplet generation and dispersal means spraying droplets onto the gas in the quench tube to form quenched gas;

the quench tube also having a quench sump, the quench sump collecting excess droplets into a quench drain, the quench drain artificially maintained at a predetermined hydrostatic pressure; and evacuating means, said evacuating means disposed to forcibly evacuate the intercommunicating hopper, broadcaster, first combustion chamber, second combustion chamber and quench tube to impart a substantially constant negative pressure throughout;

whereby the negative pressure tends to draw air into the waste processor, replenishing oxygen and encouraging a continuous flow of waste.

* * * * *